(12) United States Patent
Sakayori et al.

(10) Patent No.: US 12,077,184 B2
(45) Date of Patent: Sep. 3, 2024

(54) VEHICLE CONTROL SYSTEM

(71) Applicant: Hitachi, Ltd, Tokyo (JP)

(72) Inventors: Go Sakayori, Tokyo (JP); Junya Takahashi, Tokyo (JP); Kenta Maeda, Tokyo (JP); Shinya Kasai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 17/595,271

(22) PCT Filed: Apr. 17, 2020

(86) PCT No.: PCT/JP2020/016814
§ 371 (c)(1),
(2) Date: Nov. 12, 2021

(87) PCT Pub. No.: WO2020/261724
PCT Pub. Date: Dec. 30, 2020

(65) Prior Publication Data
US 2022/0242449 A1    Aug. 4, 2022

(30) Foreign Application Priority Data

Jun. 25, 2019 (JP) .................. 2019-116998

(51) Int. Cl.
*B60W 60/00* (2020.01)
*B60W 40/08* (2012.01)
(Continued)

(52) U.S. Cl.
CPC ........ *B60W 60/0013* (2020.02); *B60W 40/08* (2013.01); *B60W 40/10* (2013.01);
(Continued)

(58) Field of Classification Search
CPC .......................... B60G 17/017; B60G 17/019; B60G 17/0195; B60G 2400/05; B60G 2600/182;
(Continued)

(56) References Cited

U.S. PATENT DOCUMENTS

2017/0136842 A1* 5/2017 Anderson .......... B60G 17/0162
2018/0141570 A1   5/2018 Kimura
(Continued)

FOREIGN PATENT DOCUMENTS

JP            7-179140 A    7/1995
JP         2012-59274 A    3/2012
(Continued)

OTHER PUBLICATIONS

Japanese-language Office Action issued in Japanese Application No. 2019-116998 dated Jan. 17, 2023 with English translation (six (6) pages).

(Continued)

*Primary Examiner* — Peter D Nolan
*Assistant Examiner* — Ce Li Li
(74) *Attorney, Agent, or Firm* — Crowell & Moring LLP

(57) ABSTRACT

The purpose of the present invention is to provide a vehicle control system that can achieve highly comfortable autonomous driving according to the behavior of an occupant by changing a control mode of the autonomous driving according to the behavior of the occupant. To this end, a vehicle control system, which automatically drives a vehicle, comprises: an occupant information detection unit that detects, on the basis of in-vehicle information, position information and behavior information on the occupant; a tolerance calculation unit that calculates a vehicle motion tolerance on the basis of the position information and the behavior information detected by the occupant information detection unit; a trajectory generation unit that generates, on the basis of the vehicle motion tolerance calculated by the tolerance calculation unit, trajectory information including a traveling-scheduled route and time; and an autonomous driving control unit that generates, according to the trajectory infor- (Continued)

mation generated by the trajectory generation unit, a control command value to be sent to an actuator of the vehicle.

9 Claims, 16 Drawing Sheets

(51) Int. Cl.
*B60W 40/10* (2012.01)
*G06V 20/59* (2022.01)

(52) U.S. Cl.
CPC ..... *G06V 20/593* (2022.01); *B60W 2420/403* (2013.01); *B60W 2520/125* (2013.01); *B60W 2520/14* (2013.01); *B60W 2540/043* (2020.02); *B60W 2540/225* (2020.02); *B60W 2540/227* (2020.02); *B60W 2556/40* (2020.02)

(58) Field of Classification Search
CPC ........ B60G 2800/012; B60G 2800/014; B60G 2800/016; B60G 99/002; B60W 2040/0881; B60W 2420/42; B60W 2520/10; B60W 2520/125; B60W 2520/14; B60W 2540/01; B60W 2540/043; B60W 2540/045; B60W 2540/049; B60W 2540/225; B60W 2540/227; B60W 2540/229; B60W 2552/30; B60W 2556/40; B60W 2720/106; B60W 2720/125; B60W 2720/14; B60W 30/10; B60W 30/182; B60W 40/08; B60W 40/10; B60W 60/0011; B60W 60/0013; G06V 20/588; G06V 20/593; G06V 20/597; G08G 1/00; G08G 1/16

See application file for complete search history.

(56) References Cited

U.S. PATENT DOCUMENTS

| | | | |
|---|---|---|---|
| 2020/0159251 A1* | 5/2020 | Iwasaki | ................ B60R 16/037 |
| 2020/0169705 A1 | 5/2020 | Iwasaki et al. | |
| 2020/0207368 A1* | 7/2020 | Takagi | .................. B60K 28/02 |
| 2021/0114619 A1 | 4/2021 | Mimura | |
| 2021/0284202 A1 | 9/2021 | Furumoto et al. | |

FOREIGN PATENT DOCUMENTS

| | | |
|---|---|---|
| JP | 2017-223591 A | 12/2017 |
| JP | 2018-81624 A | 5/2018 |
| WO | WO 2018/100619 A1 | 6/2018 |
| WO | WO 2018/142458 A1 | 8/2018 |
| WO | WO 2018/230709 A1 | 12/2018 |

OTHER PUBLICATIONS

International Search Report (PCT/ISA/210) issued in PCT Application No. PCT/JP2020/016814 dated Jul. 14, 2020 with English translation (four (4) pages).

Japanese-language Written Opinion (PCT/ISA/237) issued in PCT Application No. PCT/JP2020/016814 dated Jul. 14, 2020 (four (4) pages).

* cited by examiner

FIG.4
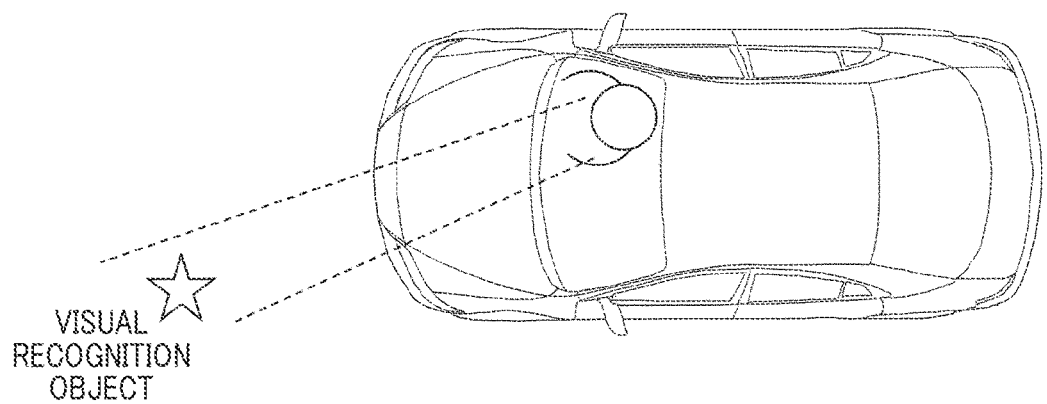
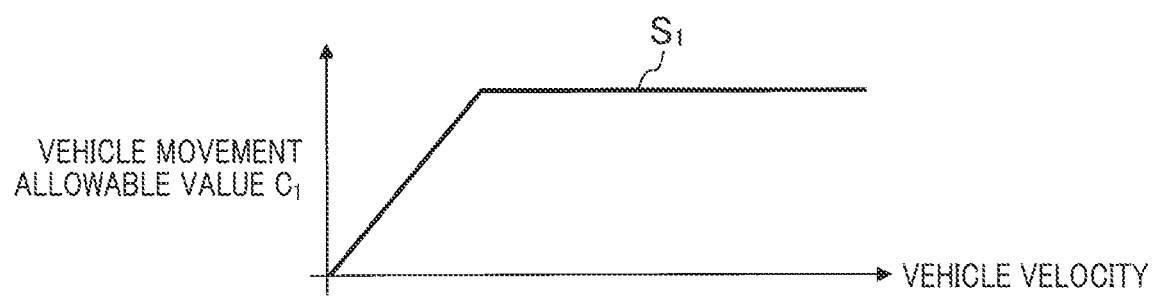
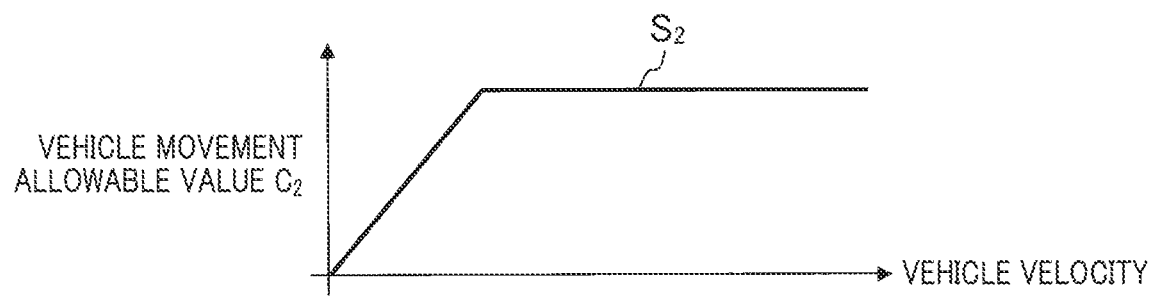
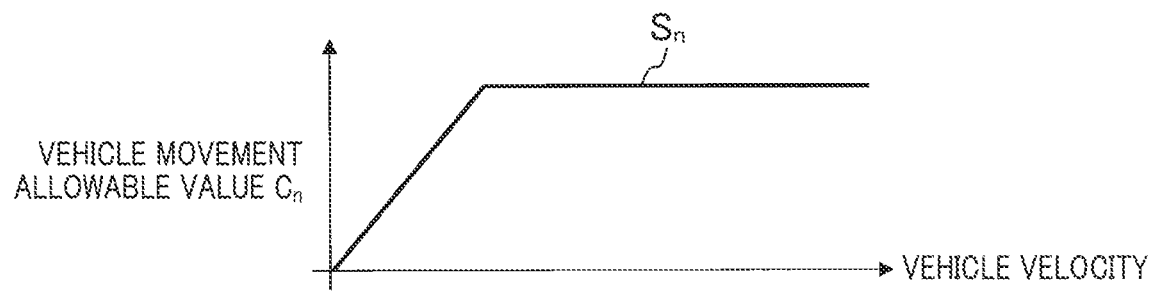

FIG.5
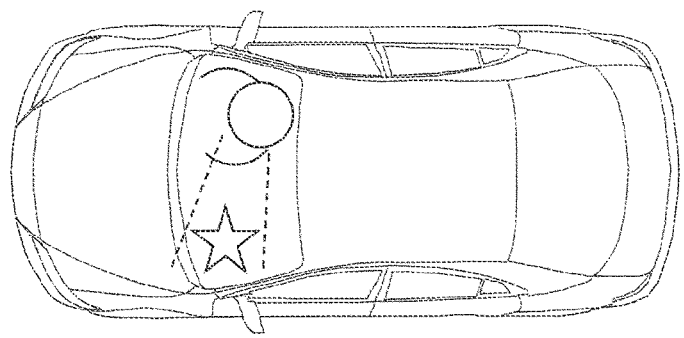
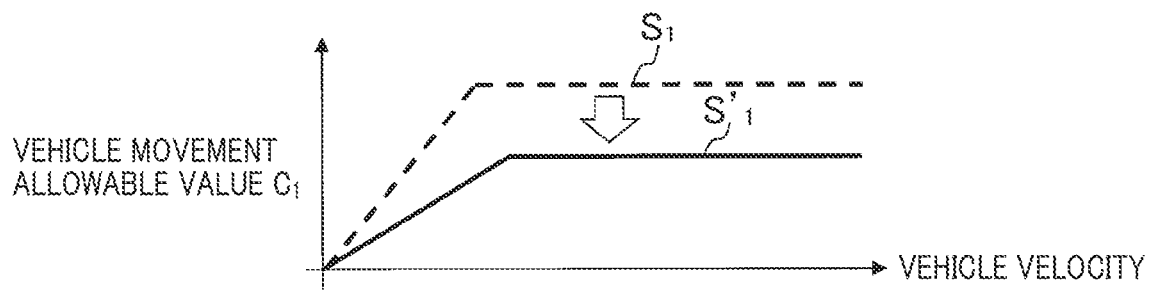
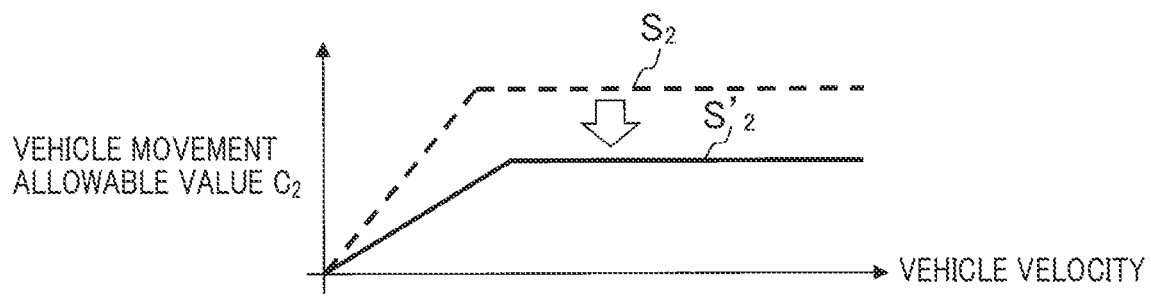
⋮
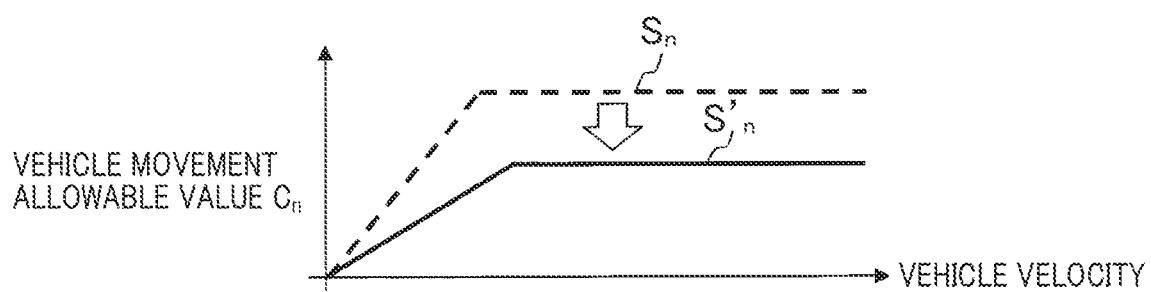

FIG.6
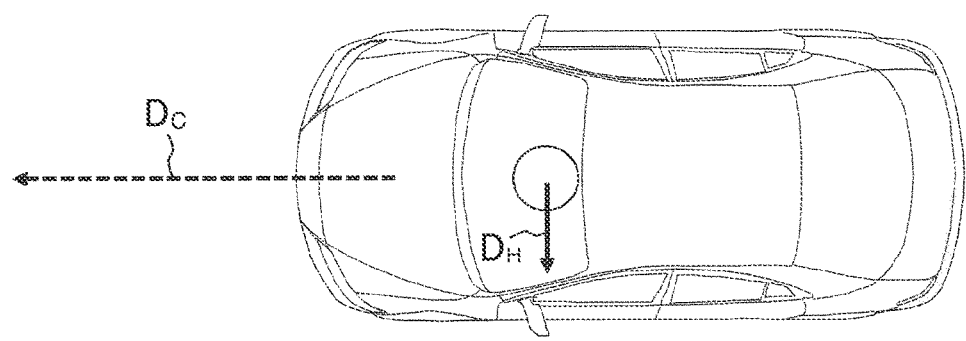
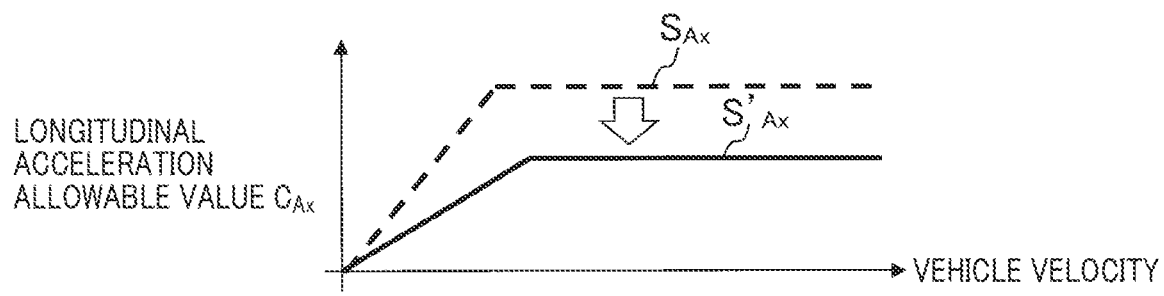
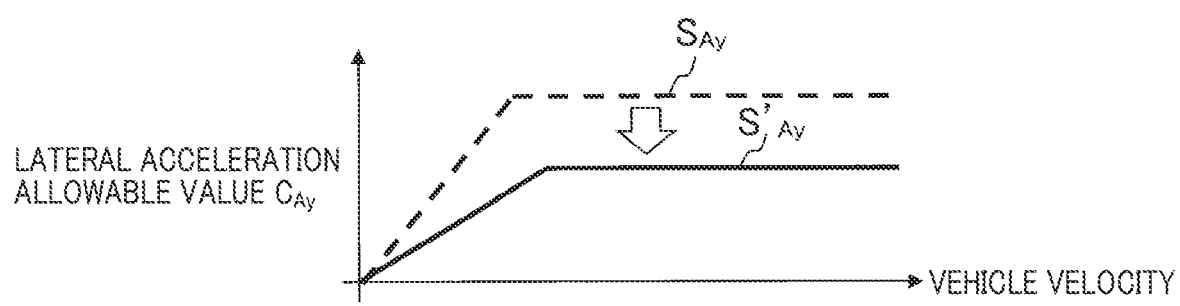

VEHICLE CONTROL SYSTEM

TECHNICAL FIELD

The present invention relates to a vehicle control system which enables automatic driving of a vehicle.

BACKGROUND ART

As a conventional automatic driving vehicle which provides an occupant of a vehicle with comfortable driving, there has been known a vehicle described in patent literature 1, for example. In the Abstract of this literature, there is the description "Provided is an automatic driving vehicle which provides an occupant of a vehicle with comfortable driving by reducing carsick of the occupant or by preventing the occupant from getting carsick by performing a drive control corresponding to a carsick state of the occupant." As a means to acquire such an object, "provided is an automatic driving vehicle 1 which can perform automatic traveling in accordance with a preset traveling plan, wherein a carsick state of an occupant of a vehicle is detected, and an automatic drive control is performed corresponding to a carsick state of the occupant. With such an automatic drive control, a carsick of the occupant of the vehicle can be reduced or prevented." That is, in patent literature 1, a carsick of the occupant is reduced by performing automatic driving corresponding to a carsick state of the occupant.

CITATION LIST

Patent Literature

[Patent literature 1] JP-A NO 2012-59274

SUMMARY OF INVENTION

Technical Problem

During automatic driving of a vehicle, driving of the vehicle by an occupant is unnecessary. Accordingly, it is not always the case that the occupant who is seated on a driver's seat is watching a front side spreading outside the vehicle and there is a possibility that the occupant is conducting various activities such as reading a book or watching a moving image. In view of such circumstances, if a control mode of automatic driving could be changed corresponding to the content of the activity of the occupant, the comfortability of the occupant can be further enhanced.

However, the automatic driving vehicle 1 disclosed in patent literature 1 aims at the reduction of carsick after an occupant has got carsick. Accordingly, even when an occupant is conducting a behavior such as reading a book, so long as the occupant has not got carsick, a control mode of the automatic driving is not changed or is held constant and hence, depending on behavior (watching a moving image, reading a book or the like) of the occupant, there may be a case where the vehicle cannot provide comfortable automatic driving to the occupant.

In view of the above-mentioned circumstances, it is an object of the present invention to provide a vehicle control system which can realize automatic driving with high comfortability corresponding to a behavior of an occupant by changing a control mode of automatic driving corresponding to the behavior of the occupant.

Solution to Problem

To overcome the above-mentioned drawbacks, a vehicle control system according to the present invention is a system which enables a vehicle to perform automatic traveling, wherein the system includes: an occupant information detection unit configured to detect position information and behavior information of an occupant based on vehicle inside information; an allowable value calculation unit configured to calculate a vehicle movement allowable value based on the position information and the behavior information which the occupant information detection unit detects; a trajectory generation unit configured to generate trajectory information including a scheduled route and a scheduled time of traveling based on the vehicle movement allowable value calculated by the allowable value calculation unit; and an automatic traveling control unit configured to generate a control command value transmitted to an actuator of the vehicle corresponding to the trajectory information which the trajectory generation unit generates.

Advantageous Effects of Invention

According to the automatic driving system of the present invention, automatic driving with high comfortability corresponding to a behavior of an occupant can be realized by changing a control mode of an automat operation corresponding to a behavior of the occupant.

BRIEF DESCRIPTION OF DRAWINGS

FIG. 4 is a view provided for describing an operation example in a case where an object to be visually recognized by an occupant exists outside the vehicle in the first embodiment.

FIG. 5 is a view provided for describing an operation example in a case where the object to be visually recognized by an occupant exists inside the vehicle in the first embodiment.

FIG. 6 is a view provided for describing an operation example in a case where a vehicle traveling direction and an occupant direction differ from each other in the first embodiment.

DESCRIPTION OF EMBODIMENTS

Hereinafter, embodiments of the present invention are described with reference to the drawings.

First Embodiment

A vehicle control system according to the first embodiment of the present invention is described with reference to FIG. 1 to FIG. 9.

Figure 1:
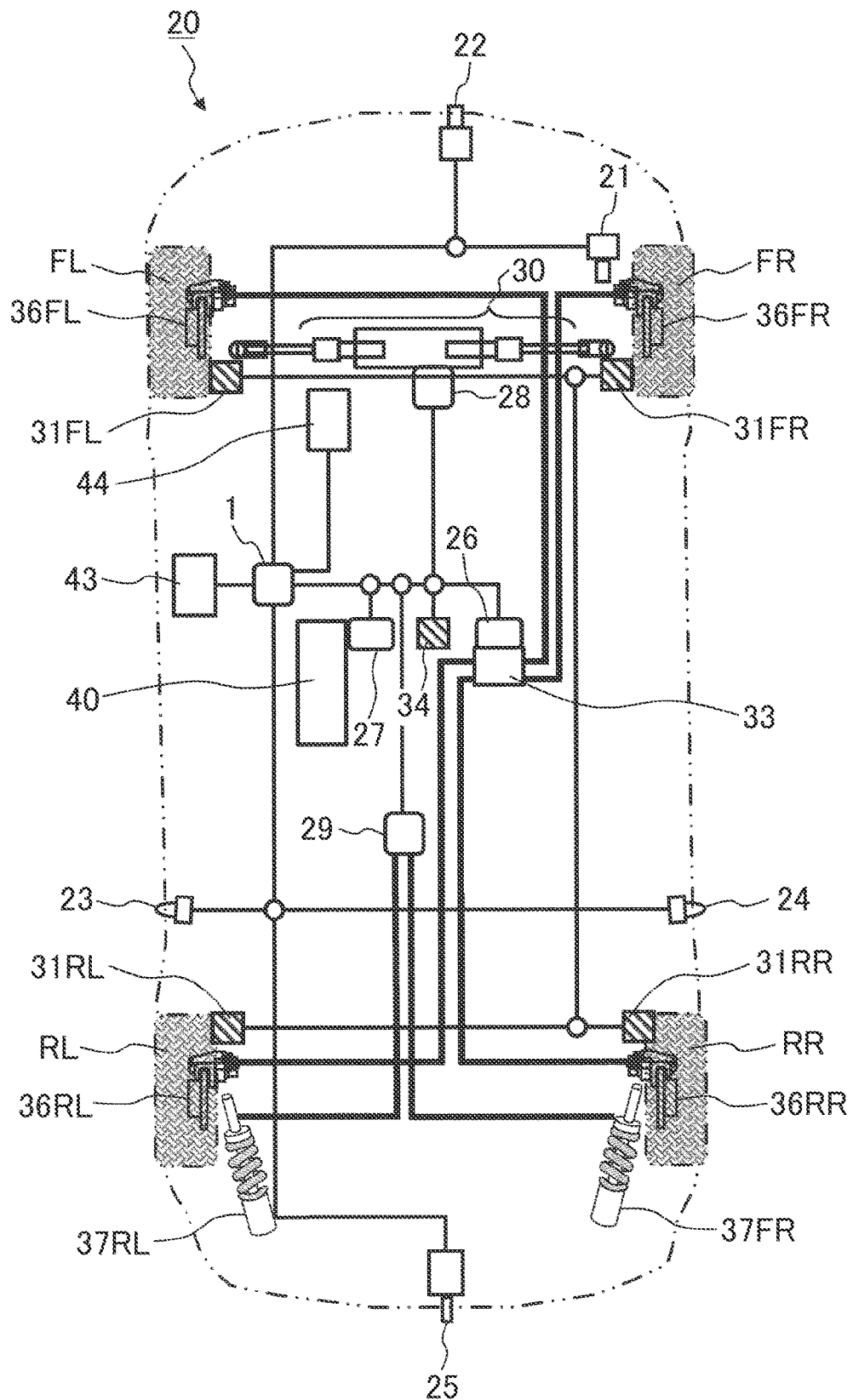
FIG. 1 is a schematic configurational view of a vehicle to which a first embodiment is applied.

FIG. 1 is an overall configurational view of a vehicle 20 on which a vehicle control system 1 according to this embodiment is mounted as viewed from above. In FIG. 1 FL indicates a left front wheel, FR indicates a right front wheel, RL indicates a left rear wheel, and RR indicates a right rear wheel.

Vehicle-mounted sensors 22 to 25 which recognize an external field are mounted on the front, rear, left, and right sides of the vehicle 20. These vehicle-mounted sensors 22 to 25 are each formed of a fish-eye camera having a viewing angle of 180°, for example. By mounting these vehicle-mounted sensors 22 to 25 on the front, rear, left and right sides of the vehicle 20, it is possible to detect relative distances and relative speeds with respect to other vehicles, bicycles, pedestrians, obstacles, and the like existing around the vehicle 20. These vehicle-mounted sensors may be replaced with sound wave sensors, stereoscopic cameras, or infrared cameras. Further, the configuration may be adopted where a laser radar which can perform sensing the whole circumference of 360° may be mounted on a ceiling of the vehicle 20 in place of the sensors mounted on the front, rear, left and right sides of the vehicle 20.

An inner sensor 21 which recognizes the inside the vehicle is disposed in the vehicle 20. The inner sensor 21 is, for example, a camera which can detect the positions and the behaviors of occupants riding on the vehicle 20. The camera is mounted on a back side of a front shield of the vehicle 20 toward the occupants. The inner sensor may be replaced with a laser radar, a thermographic camera, a sensor attached to an occupant or a sensor mounted on a seat.

An inner sensor 34 is a detection device which detects a traveling state of the vehicle 20. The inner sensor 34 includes sensors such as a vehicle velocity sensor, an acceleration sensor, a gyroscope sensor. The vehicle velocity sensor is a detector which detects a speed of the vehicle 20. As the vehicle velocity sensor, for example, wheel speed sensors 31FL to 31RR which are mounted on the respective wheels FL to RR, drive shafts which integrally rotate with the respective wheels FL to RR or the like, and detect rotational speeds of the wheels are used. The acceleration sensor is a detector which detects acceleration of the vehicle 20. The acceleration sensor includes, for example, a longitudinal acceleration sensor which detects longitudinal acceleration Ax of the vehicle 20, a lateral acceleration sensor which detects lateral acceleration Ay of the vehicle 20, and a vertical acceleration sensor which detects vertical acceleration Az of the vehicle 20. The gyroscope sensor is a detector which detects an angular velocity of the vehicle 20. The gyroscope sensor includes, for example, a yaw-rate sensor which detects a yaw rate Ry of the vehicle 20 (an angular velocity of the vehicle 20 when the vehicle 20 rotates using a vertical direction of the vehicle 20 as an axis), a roll-rate sensor which detects a roll rate Rr (an angular velocity of the vehicle 20 when the vehicle rotates using a longitudinal direction of the vehicle 20 as an axis), and a pitch-rate sensor which detects a pitch rate Rp of the vehicle 20 (an angular velocity of the vehicle 20 when the vehicle 20 rotates around using the lateral direction of the vehicle 20 as an axis).

The vehicle control system 1 is a system which performs an automatic driving where signals from the sensors such as the inner sensors 21, the vehicle-mounted sensors 22 to 25 are inputted to the vehicle control system 1, and the vehicle control system 1 outputs command signals to a brake control device 26, a driving control device 27, a steering control device 28, a suspension control device 29, a vehicle-mounted communication device 43, and a display device 44.

In this embodiment, the brake control device 26 is a device which controls a brake mechanism 33 based on a command signal from the vehicle control system 1 so as to adjust the distribution of a braking force by way of wheel cylinders 36FL to 36RR of the respective wheels. The drive control device 27 controls a drive mechanism 40 based on a command signal from the vehicle control system 1 so as to adjust a torque output of a drive-use actuator such as an engine or a motor. The steering control device 28 controls a front wheel steering mechanism 30 based on a commando signal from the vehicle control system 1 so as to control an advancing direction of the vehicle 20. The suspension control device 29 controls a suspension mechanism 37 (the illustration of the suspension mechanism of the front wheels being omitted) based on a command signal from the vehicle control system 1 so as to control vertical movement of the vehicle 20.

The vehicle-mounted communication device 43 is a device which performs communication between a road and the vehicle or between vehicles. However, in place of the vehicle-mounted communication device 43, a configuration may be adopted where required information is acquired from a recording reproducing device such as a memory medium (a USB memory, an SD card, an HDD or the like). The display device 44 is device which displays a traveling plan of the vehicle 20, a moving image, and the like. It is desirable to use a touch-panel-type display as the display device 44 so as to allow an occupant to directly manipulate the display device 44.

Figure 2:
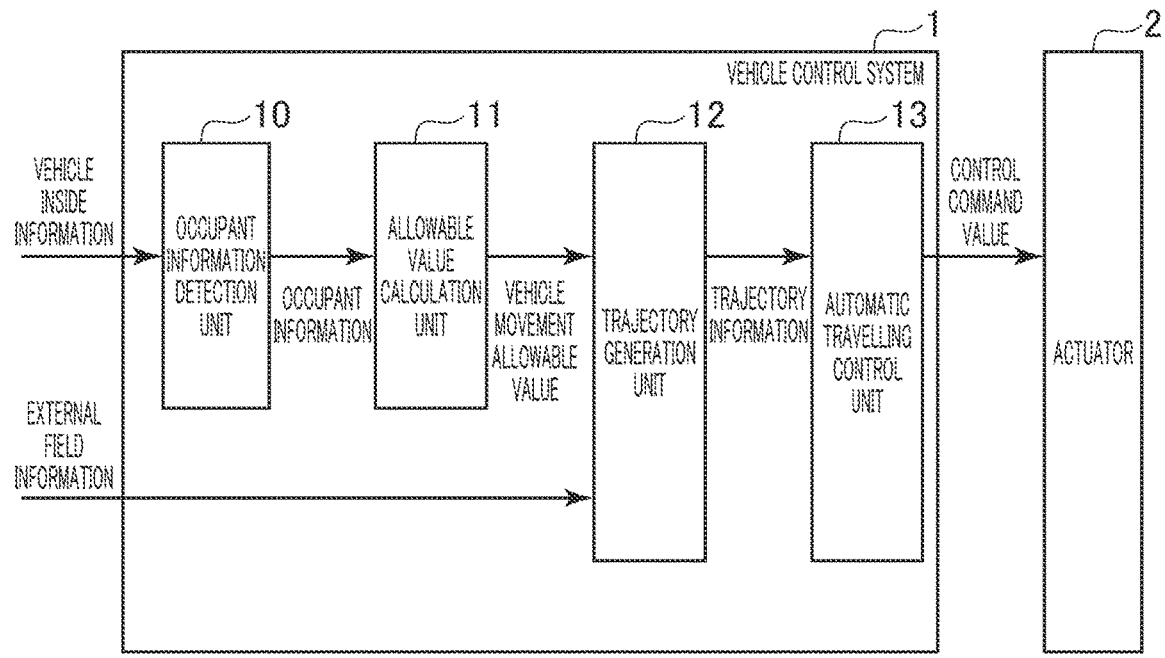
FIG. 2 is a block diagram provided for describing an operation of a vehicle control system according to the first embodiment.

FIG. 2 is a block diagram showing a main part of the vehicle control system 1. As shown in FIG. 2, the vehicle control system 1 includes, mainly, an occupant information detection unit 10, an allowable value calculation unit 11, a trajectory generation unit 12, and an automatic traveling control unit 13. The vehicle control system 1 generates control command values supplied to actuators 2 (specifically, the front wheel stirring mechanism 30, the brake mechanism 33, drive mechanism 40 and the like) based on vehicle inside information acquired from the inner sensor 21 and the like, and external field information acquired by the vehicle-mounted sensors 22 to 25 and the like.

In the actual configuration, the vehicle control system 1 is a computer which includes hardware such as an arithmetic unit such as CPU, a main memory device such as a semiconductor memory, an auxiliary memory device, and a communication device. The respective functions described later are realized by allowing the arithmetic unit to execute programs loaded in the main storage device while looking up database recorded in the auxiliary memory device. However, the description is made hereinafter while suitably omitting techniques well-known in such a computer field. It is not always necessary that the vehicle control system 1 is mounted on the vehicle 20, and control command values may be generated on a cloud, or control command values may be generated by applications installed in a smartphone of an individual occupant.

Hereinafter, the occupant information detection unit 10, the allowable value calculation unit 11, the trajectory generation unit 12, and the automatic traveling control unit 13 in this embodiment are described in detail sequentially.

<Occupant Information Detection Unit 10>

The occupant information detection unit 10 estimates a riding position and behavior of an occupant, a direction that a body of the occupant is directed (occupant direction $D_H$) and the like based on vehicle inside information acquired from the inner sensor 21 such as a camera, and stores the estimated values in the memory device of the vehicle control system 1. As specific examples of the behavior of the occupant, sleeping, reading, watching a video and the like are named.

Figure 3:
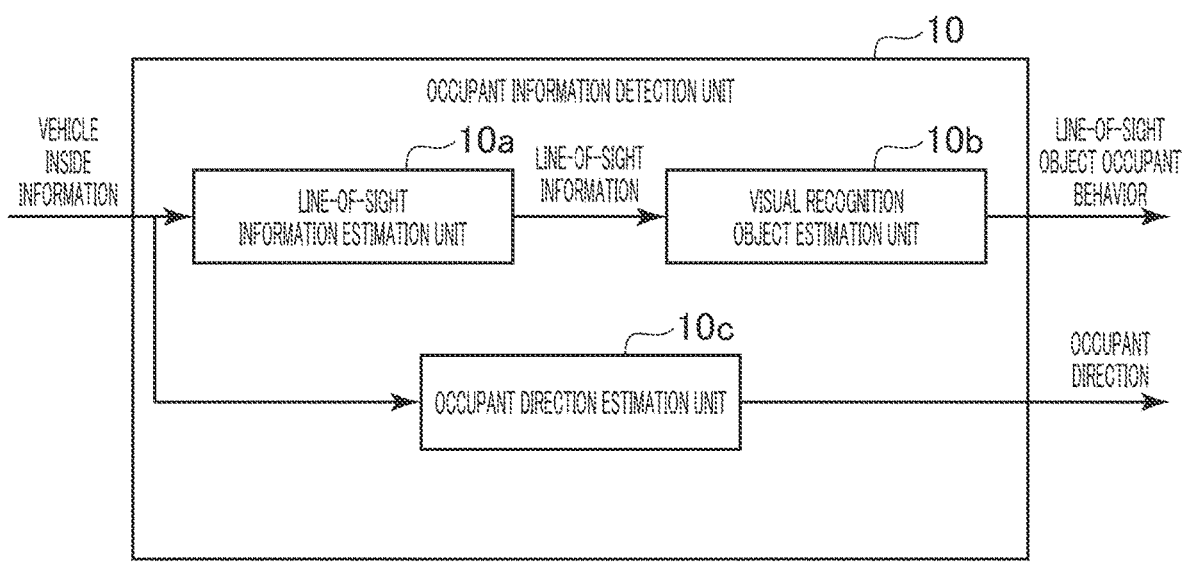
FIG. 3 is a block diagram provided for describing an operation of an occupant information detection unit according to the first embodiment.

FIG. 3 is a block diagram showing a main part of the occupant information detection unit 10. As shown in FIG. 3, the occupant information detection unit 10 includes a line-of-sight information estimation unit 10a, a visual recognition object estimation unit 10b, and an occupant direction estimation unit 10c.

The line-of-sight information estimation unit 10a detects or estimates a line of sight of the occupant based on vehicle inside information acquired from the inner sensor 21. For example, the line-of-sight information estimation unit 10a tracks the movement of an eyeball of the occupant by a camera and may estimate line-of-sight information.

Visual recognition object estimation unit 10b detects or estimates a visual recognition object of the occupant and the behavior of the occupant based on line-of-sight information outputted from the line-of-sight information estimation unit 10a. In this case, first, the visual recognition object estimation unit 10b determines whether the visual recognition object of the occupant is disposed outside the vehicle or the inside the vehicle based on line-of-sight information.

Then, when it is estimated that the visual recognition object of the occupant is disposed outside the vehicle, the visual recognition object is not finely classified, and the visual recognition object is assumed as a vehicle outside object. The behavior of the occupant is also not finely classified, and is assumed as a vehicle outside visual recognition object.

On the other hand, when it is estimated that the visual recognition object of the occupant is disposed inside the vehicle, the detailed determination of the visual recognition object and the behavior of the occupant is performed. As a visual recognition object, a book, a document, a display, a conversation partner, and the like are named, for example. As a method of determining the visual recognition object, a method which estimates an object disposed on an extension of a line of sight of the occupant from a database, a method which estimates such an object from a learning model (deep learning which uses video information as an input or the like) may be named. Simultaneously, the visual recognition object estimation 10b also determines whether or not the occupant grasps the visual recognition object. Further, the visual recognition object estimation unit 10b estimates the behavior of the occupant based on line-of-sight information and visual recognition object information. The visual recognition object estimation unit 10b may directly estimate the behavior of the occupant based on a learning model which estimates the behavior of the occupants.

The occupant direction estimation unit 10c estimates which direction the body of the occupant is directed (the relative occupant direction $D_H$ with respect to the advancing direction $D_C$ of the vehicle based on vehicle inside information acquired from the inner sensor 21.

<Allowable Value Calculation Unit 11>

The allowable value calculation unit 11 decides a vehicle movement control value which is allowed so as to prevent an occupant from having a discomfort feeling (hereinafter referred to as "vehicle movement allowable value C") based on occupant information (visual recognition object, occupant behavior, an occupant direction or the like) acquired from the object information detection unit 10. The vehicle movement allowable value C includes, more specifically, allowable values with respect to a longitudinal acceleration Ax, a lateral acceleration Ay, a vertical acceleration Az, a yaw rate Ry, a roll rate Rr, a pitch rate Rp, and the like which are physical quantities expressing vehicle movement information.

For example, as shown in FIG. 4, in a case where a visual recognition object (indicated by a star symbol in the drawing) of an occupant exists outside a vehicle, irrespective of whether a riding position of the occupant is a driver's seat or a rear seat, vehicle movement allowable values $C_1$ to $C_n$ are set to reference values $S_1$ to $S_n$. The reference value S is, in general, a threshold value of a physical quantity which makes an occupant have a discomfort feeling. For example, the reference value is ±0.2 G with respect to the longitudinal acceleration Ax. As shown in FIG. 4, the reference value S is set such that although the reference value S is increased in proportion to a vehicle velocity when the vehicle velocity is low, after the vehicle velocity reaches a predetermined velocity, the reference value S becomes constant.

On the other hand, as shown in FIG. 5, in a case where the visual recognition object (indicated by a star symbol) of the occupant exists inside the vehicle, the vehicle movement allowable value C is set to a suppressed value S' smaller than the reference value S. That is, the suppressed values $S'_1$ to $S'_n$ which are smaller than the reference values $S_1$ to $S_n$ are set to vehicle movement allowable values $C_1$ to $C_n$.

For example, in a case where an object which forms a visual recognition object is grasped by an occupant, a deviation of a line of sight occurs due to the generation of longitudinal acceleration Ax and vertical acceleration Az and hence, there is a possibility that an occupant has a discomfort feeling or the occupant gets carsick. In view of the above, in a case where an object which forms a visual recognition object is grasped by an occupant (for example, during reading), a longitudinal acceleration allowable value $C_{Ax}$ and a vertical acceleration allowable value $C_{Az}$ of a vehicle are changed to suppressed values S' which are smaller than the respective reference values S.

On the other hand, in a case where an object which forms a visual recognition object is not grasped by an occupant, that is, in a case where the occupant is viewing a display or the like disposed in a vehicle, vehicle movement allowable values C are changed corresponding to a kind of content that the occupant is viewing. For example, by separately preparing the suppressed values S' for viewing a video and the suppressed values S' for viewing a still image, the vehicle movement allowable value C at the time of viewing a slide show image is set smaller than the vehicle movement allowable value C at the time of viewing a news video.

Further, in a case where a visual recognition object of an occupant exists inside a vehicle as shown in FIG. 6, the vehicle movement allowable value C is changed based on an occupant direction $D_H$. Even when a visual recognition object and behavior of the occupant are equal, the vehicle movement allowable value C is set smaller in a case where the advancing direction $D_C$ and the occupant direction $D_H$ are different from each other compared to a case where the advancing direction $D_C$ and the occupant direction $D_H$ are substantially equal. For example, as shown in FIG. 6, the longitudinal acceleration allowable value $C_{Ax}$ and the lateral acceleration allowable value $C_{Ay}$ which are components of the vehicle movement allowable value C are set to suppressed values $S'_{Ax}$, $S'_{Ay}$ which are smaller than the reference values $S_{Ax}$, $S_{Ay}$ when the advancing direction $D_C$ and the occupant direction $D_H$ are equal.

<Trajectory Generation Unit 12>

Figure 7:
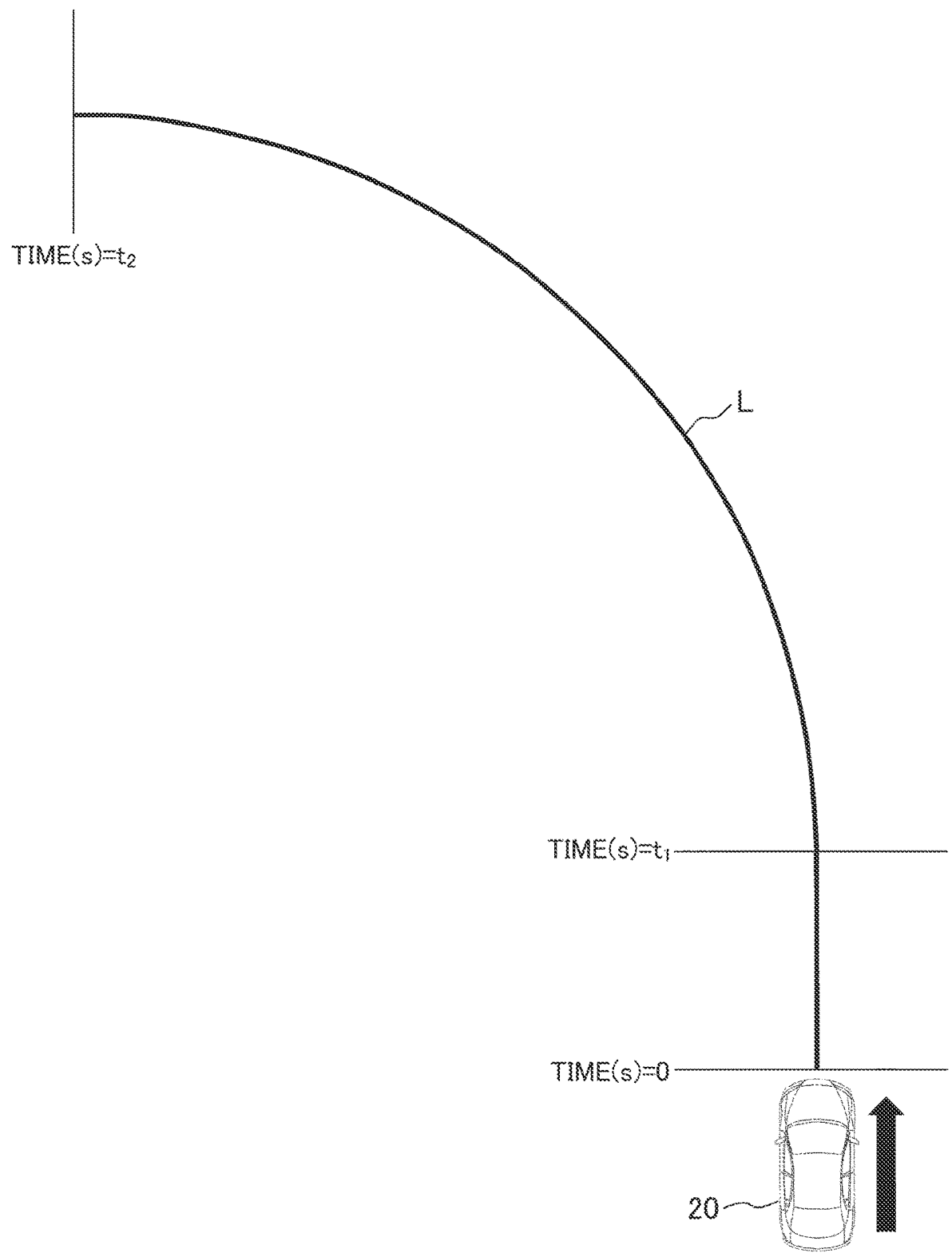
FIG. 7 is a view provided for describing the definition of a trajectory in the first embodiment.

The trajectory generation unit 12 generates trajectory information which defines a trajectory on which the vehicle 20 travels based on external field information (obstacle information and the like) acquired from the vehicle mounted sensors 22 to 25 and a vehicle movement allowable value C. In this embodiment, trajectory information is, as shown in FIG. 7, information which includes a route L on which the vehicle travels and a passing time t that the vehicle passes a predetermined position. In place of defining trajectory information based on passing time information at a predetermined position, trajectory information may be defined based on vehicle velocity information at a predetermined position. The route L is, specifically, acquired by defining coordinates of target longitudinal positions and target lateral positions set on a target route at a fixed interval.

When a longitudinal acceleration allowable value $C_{Ax}$ which the allowable value calculation unit 11 calculates is small, target traveling velocity of the vehicle 20 on the target trajectory is lowered as a whole. With such a control, the vehicle 20 can travel without generating large acceleration and deceleration. On the other hand, when a lateral acceleration allowable value $C_{Ay}$ which the allowable value calculation unit 11 calculates is small, a curvature of the target trajectory (target route) is made small. With such a control, the vehicle 20 can travel without generating large lateral acceleration Ay.

In the same manner, when a yaw rate allowable value $C_{Ry}$ which the allowable value calculation unit 11 calculates is small, a curvature of the target trajectory (target route) is made small. With such a control, the vehicle 20 can travel without being accompanied with a sudden yaw movement.

<Automatic Traveling Control Unit 13>

Figure 8:
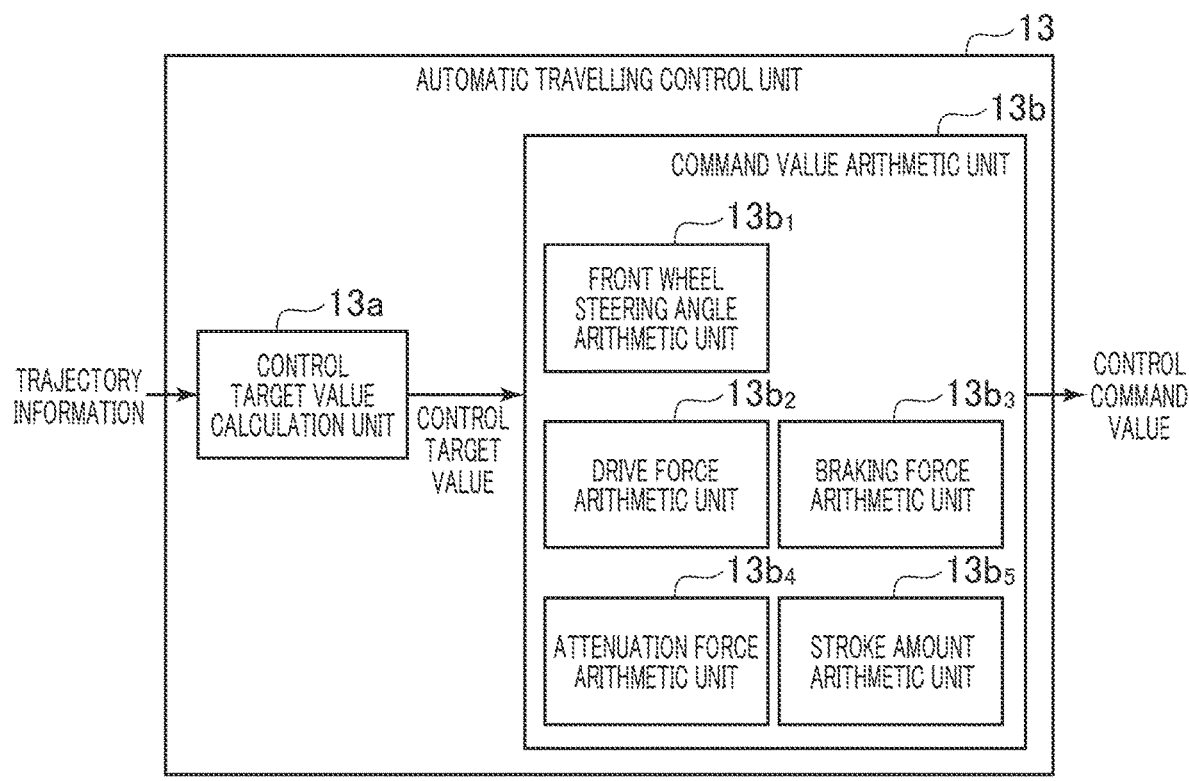
FIG. 8 is a block diagram provided for describing an operation of an automatic traveling control unit according to the first embodiment.

FIG. 8 is a block diagram showing a main part of the automatic traveling control unit 13. As shown in FIG. 8, the automatic traveling control unit 13 includes: a control target value calculation unit 13a; and a command value arithmetic unit 13b.

Figure 9:
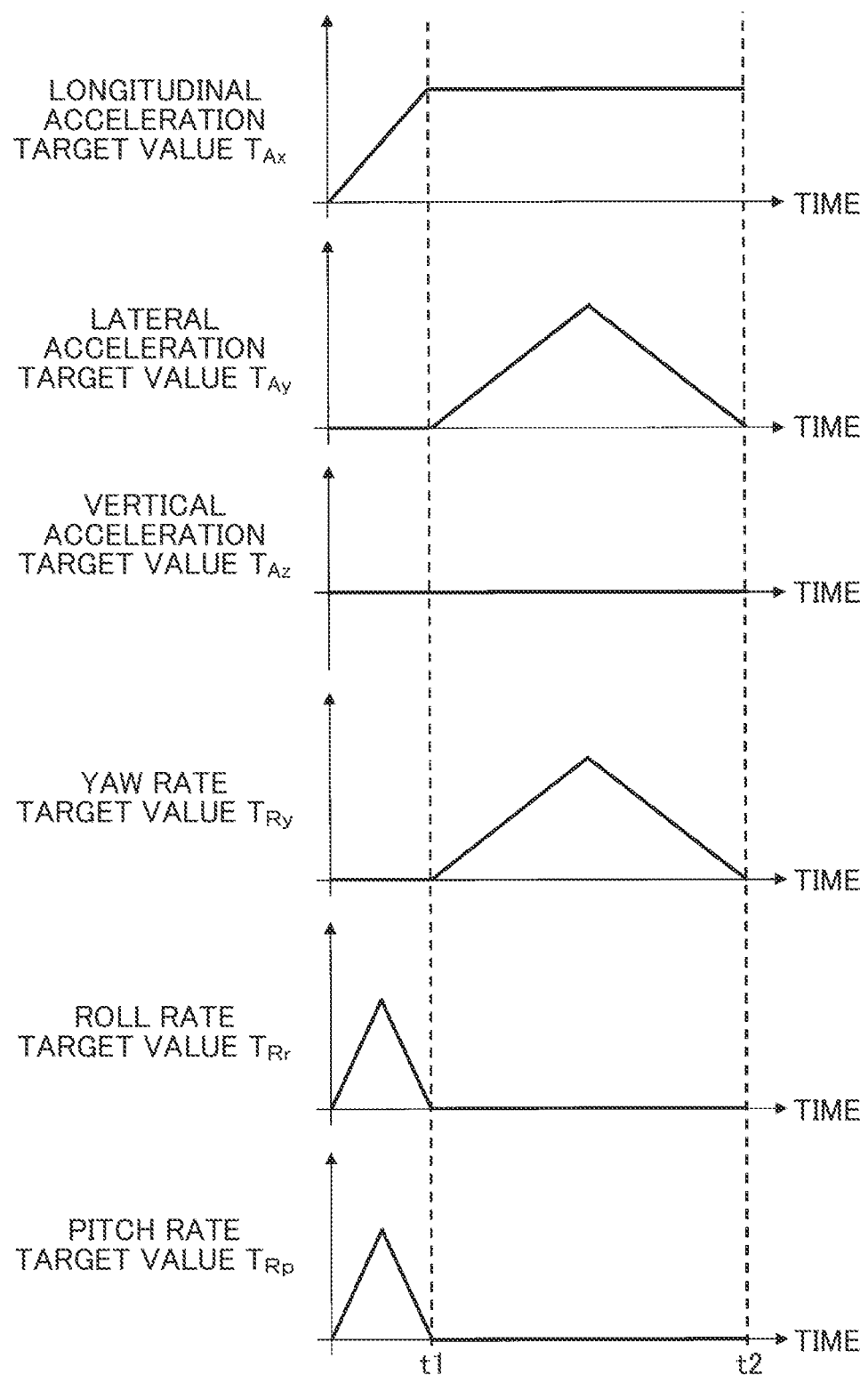
FIG. 9 is a view provided for describing the transition with time of a control target value in the first embodiment.

The control target value calculation unit 13a calculates a control target value T based on trajectory information (route information, time information) which the trajectory generation unit 12 generates. More specifically, as shown in FIG. 9, the control target value calculation unit 13a calculates a target longitudinal acceleration $T_{Ax}$, a target lateral acceleration $T_{Ay}$, a target vertical acceleration $T_{Az}$, a target yaw rate $T_{Ry}$, a target roll rate $T_{Rr}$, and a target pitch rate $T_{Rp}$ of the vehicle 20 necessary for performing automatic driving along a desired trajectory. Since a vehicle movement allowable value C is taken into account at the time of generating the trajectory by the trajectory generation unit 12, there is no possibility that the control target value T exceeds the vehicle movement allowable value C.

The command value arithmetic unit 13b calculates control command values to be outputted to the brake control device 26, the drive control device 27, the steering control device 28, and the suspension control device 29 based on a control target value T acquired by the control target value calculation unit 13a. For performing such calculation, as shown in FIG. 8, the command value arithmetic unit 13b includes a front wheel steering angle arithmetic unit $13b_1$ which calculates a control command value to the steering control device 28, a driving force arithmetic unit $13b_2$ which calculates a control command value to the drive control device 27, a braking force arithmetic unit $13b_3$ which calculates a control command value to the brake control device 26, an attenuation force arithmetic unit $13b_4$ which calculates a control command value to the suspension control device 29, and a stroke amount arithmetic unit $13b_5$.

To realize a target longitudinal acceleration $T_{Ax}$ which the control target value calculation unit 13a calculates, it is necessary to adjust braking forces and driving forces applied to the respective wheels. Accordingly, the driving force arithmetic unit $13b_2$ calculates appropriate driving force command values, and the braking force arithmetic unit $13b_3$ calculates appropriate braking force command values.

To realize a target lateral acceleration $T_{Ay}$ which the control target value calculation unit 13a calculates, it is necessary to adjust a front wheel steering angle. Accordingly, the front wheel steering angle arithmetic unit $13b_1$ calculates an appropriate front wheel steering angle command value, and a lateral force is generated on the tires by operating the front wheel steering mechanism 30 so that a lateral force is generated on tires and a desired lateral movement of the tires is realized. In such an operation, the lateral force generated on the tires largely depends on a steering angle calculated by the front wheel steering angle arithmetic unit $13b_1$. However, by operating the brake mechanism 33 and the suspension mechanism 37 simultaneously with such an operation, the lateral acceleration can be more finely adjusted. In general, a lateral force generated on a tire is decided based on a steering angle, a vehicle side slip angle, a yaw rate, and a vertical load. For example, in a case where braking forces applied to the respective wheels are changed by the braking force arithmetic unit $13b_3$, loads applied to the respective wheels can be distributed uniformly. Accordingly, the lateral movement of the vehicle 20 which makes lateral forces generated on the respective wheels non-uniform can be finely adjusted. Further, the lateral movement of the vehicle 20 can be finely adjusted by adjusting vertical loads of the respective wheels by the attenuation force arithmetic unit $13b_4$ and the stroke amount arithmetic unit $13b_5$.

To realize the target vertical acceleration $T_{Az}$ which the control target value calculation unit 13a calculates, it is necessary to adjust an attenuation force and a stroke amount. Accordingly, the attenuation force arithmetic unit $13b_4$ calculates an appropriate attenuation force command value, and the stroke amount arithmetic unit $13b_5$ calculates an appropriate stroke amount command value. Further, by adjusting longitudinal acceleration of the vehicle 20 by the driving force arithmetic unit $13b_2$ and the braking force arithmetic unit $13b_3$, loads applied to the front wheels and the rear wheels of the vehicle 20 can be distributed so that the vertical acceleration Az can be adjusted.

To realize the target yaw rate $T_{Ry}$ which the control target value calculation unit 13a calculates, in the same manner as the target lateral acceleration $T_{Ay}$, it is necessary to adjust a front wheel steering angle. Further, by adjusting braking forces of the respective wheels calculated by the braking force arithmetic unit $13b_3$ as represented by a brake direct yaw moment control (DYC), it is also possible to adjust a yaw movement of the vehicle 20.

To realize the target roll rate $T_{Rr}$ which the control target value calculation unit 13a calculates, it is necessary to adjust a front wheel steering angle calculated by the front wheel steering angle arithmetic unit $13b_1$. Further, by adjusting attenuation forces or stroke amounts of the left and right wheels by the attenuation force arithmetic unit $13b_4$ or the stroke amount arithmetic unit $13b_5$, it is also possible to adjust the roll movement of the vehicle 20.

To realize the target pitch rate $T_{Rp}$ which the control target value calculation unit 13a calculates, in the same manner as the target vertical acceleration $T_{Az}$, it is necessary to adjust sinking at a front side and a rear side of the vehicle by adjusting the attenuation force arithmetic unit $13b_4$ or the stroke amount arithmetic unit $13b_5$. Further, by adjusting the longitudinal acceleration of the vehicle 20 by the driving force arithmetic unit $13b_2$ or the braking force arithmetic unit $13b_3$, it is possible to adjust the pitch movement of the vehicle 20.

To realize the plurality of control target values T simultaneously, it is sufficient that the respective command value arithmetic units in the command value arithmetic unit 13b are associated with each other so that the movement of the vehicle 20 having three axes and six degrees of freedom is generated.

Automatic driving is realized based on desired vehicle movements by outputting the control command values calculated by the automatic traveling control unit 13 to the brake control device 26, the drive control device 27, the steering control device 28 and the suspension control device 29 and hence, traveling which suits the behavior of an occupant becomes possible.

According to the automatic driving system of the present embodiment described heretofore, by changing the vehicle movement allowable values C of the automatic driving corresponding to the line of sight and the behavior of the occupant, it is possible to realize the automatic driving with high comfortability which suits the behavior of the occupant.

Second Embodiment

A vehicle control system according to a second embodiment of the present invention is described with reference to FIG. 10 to FIG. 12. The repeated description of constitutional elements substantially equal to the corresponding constitutional elements in the first embodiment is omitted.

Figure 10:
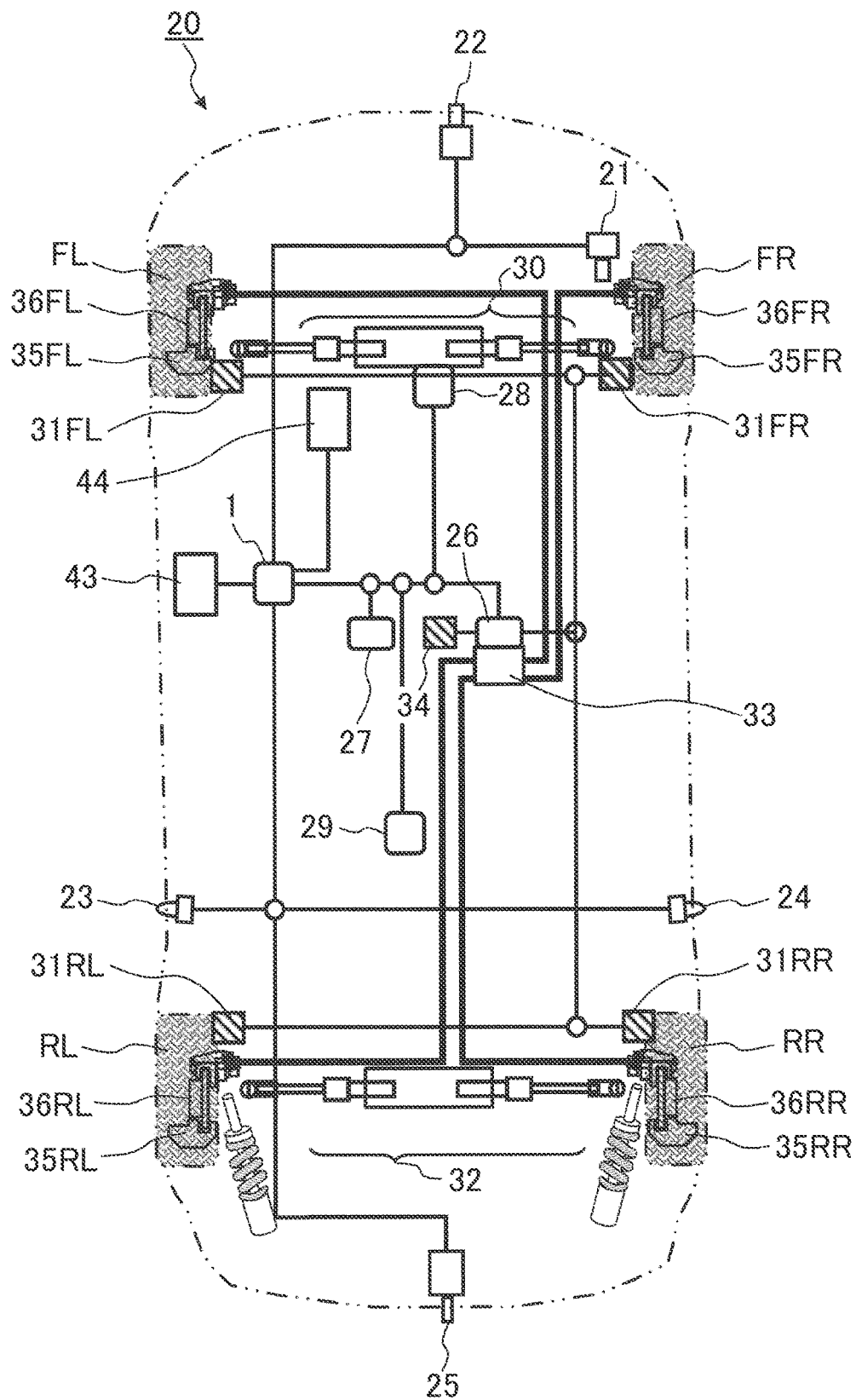
FIG. 10 is a schematic configurational view of a vehicle to which a mode of a second embodiment is applied.
Figure 11:
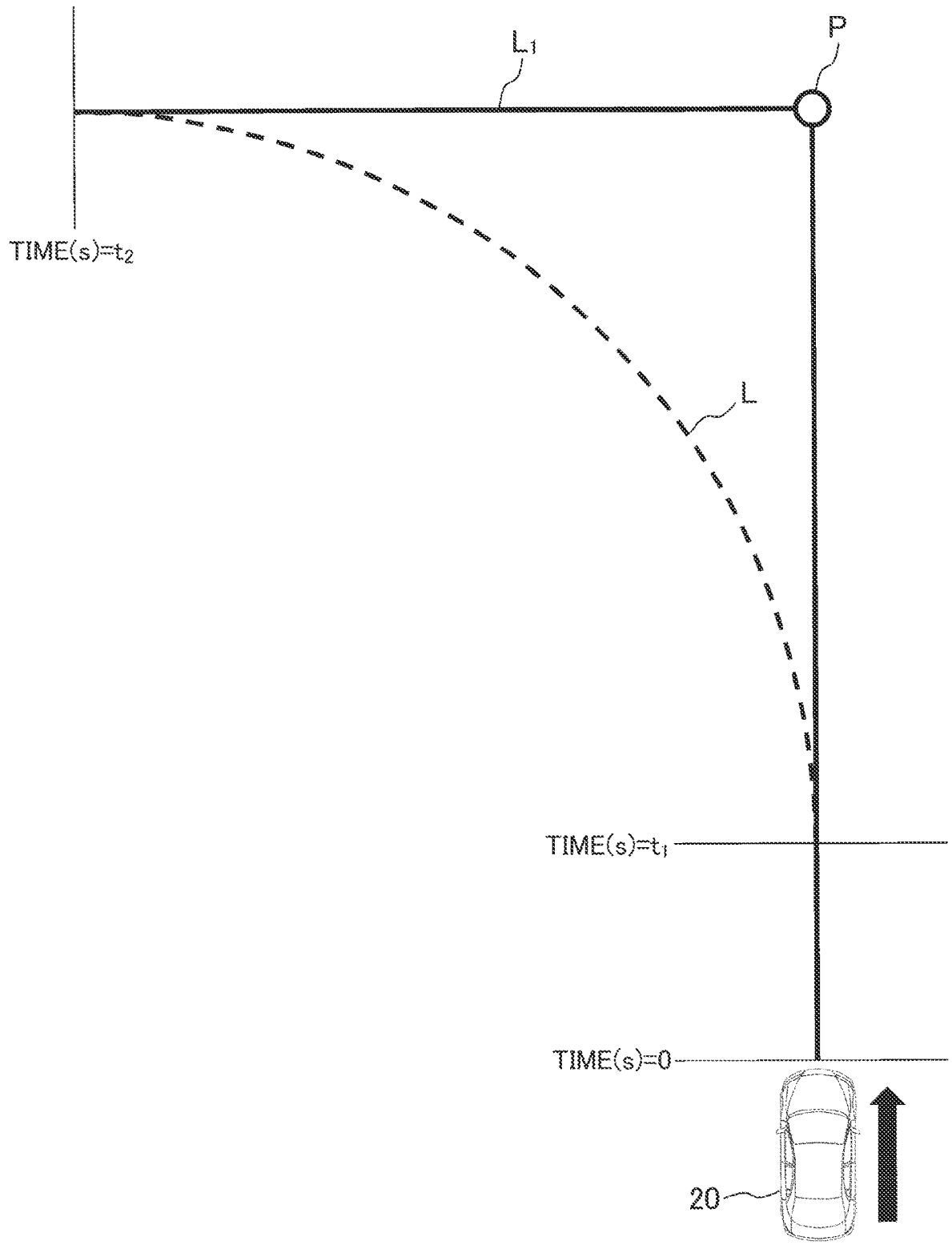
FIG. 11 is a view provided for describing an operation of a trajectory generated in the second embodiment.

FIG. 10 is an overall configurational view of a vehicle 20 on which a vehicle control system 1 according to this embodiment is mounted as viewed from above. This embodiment is configured such that in-wheel motor mechanisms 35FL to 35RR and a rear wheel steering mechanism 32 are added to the vehicle 20 according to the first embodiment.

In the brake control device 26 according to the first embodiment, the distribution of a braking force is adjusted by way of the wheel cylinders 36 of the respective wheels. In a brake control device 26 according to this embodiment, the distribution of a braking force to respective wheels is adjusted by using regenerative brakes which use motors of the in-wheel motor mechanisms 35. The regenerative brake decelerates the wheel by making the motor operate as a generator, and enables the reuse of electricity generated by such an operation thus contributing to energy saving.

The drive control device 27 according to the first embodiment controls the drive mechanism 40 (the engine or the motor) based on a command signal from the vehicle control system 1. However, a drive control device 27 according to this embodiment controls the in-wheel motor mechanisms 35 of the respective wheels based on a command signal from the vehicle control system 1.

Further, the steering control device 28 according to the first embodiment controls the front wheel steering mechanism 30 based on a command signal from the vehicle control system 1. However, a steering control device 28 according to this embodiment controls a front wheel steering mechanism 30 and a rear wheel steering mechanism 32 based on a command signal from the vehicle control system 1 thus controlling an advancing direction of the vehicle 20. The front wheel steering mechanism 30 and the rear wheel steering mechanism 32 can independently control steering angles of the left and right wheels.

In the same manner as the first embodiment, also in this embodiment, a trajectory is generated based on a vehicle movement allowable value C outputted from an allowable value calculation unit 11. In this embodiment, however, by additionally providing the in-wheel motor mechanisms 35 and the rear wheel steering mechanism 32 to the vehicle 20, it is possible to generate various trajectories. More specifically, by steering the rear wheels and the front wheels in the same direction (a same phase control), the vehicle 20 can perform the lateral movement without requiring the yaw movement. For example, in changing a lane, the vehicle 20 can change the lane while maintaining its posture angle. Accordingly, even when an allowable value of lateral acceleration which is one of the vehicle movement allowable values C is small, a trajectory can be easily generated.

By independently driving and steering the respective wheels, the vehicle 20 can rotate on a spot. Such rotation is possible on a premise that the respective wheels are drivable in both directions. With such a configuration, it is not always necessary to generate a trajectory where a curvature continuously changes. For example, besides the smooth route L shown in FIG. 7, it is also possible to generate a route Li shown in FIG. 11 where the vehicle 20 can be rotated on its site at a point P so as to change the advancing direction at an approximately right angle.

Figure 12:
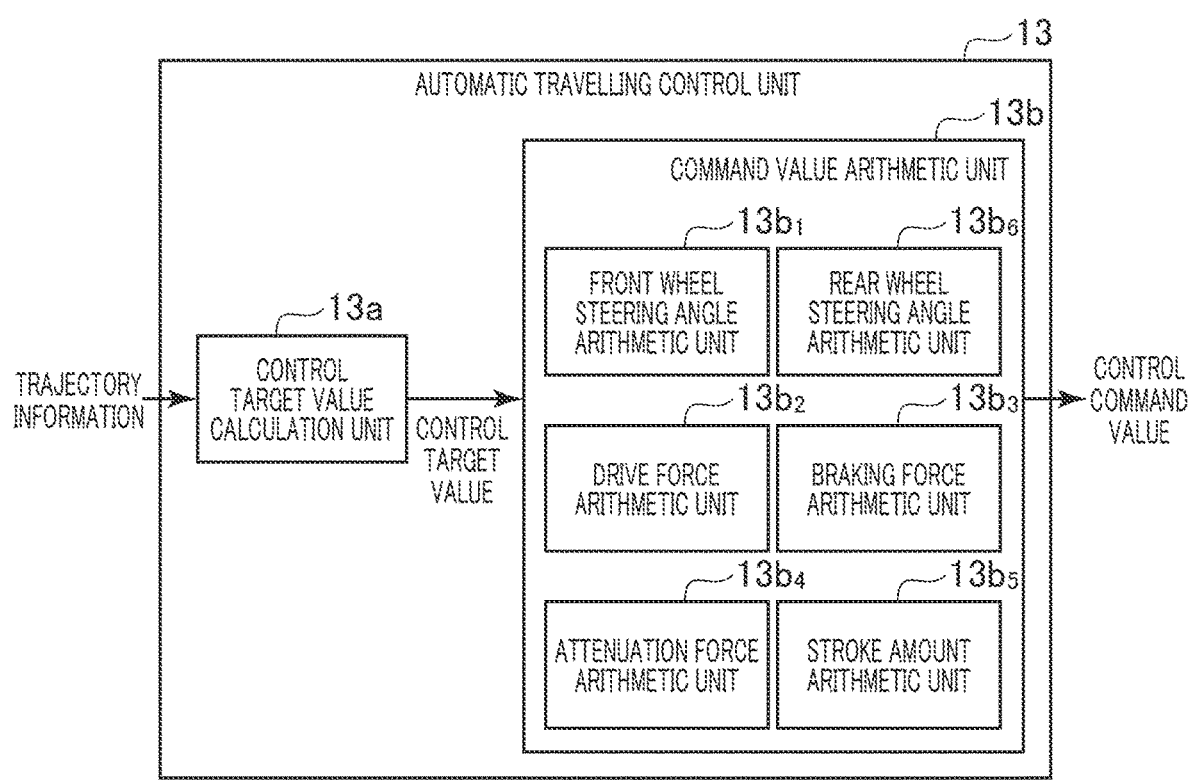
FIG. 12 is a block diagram provided for describing an operation of an automatic traveling control unit according to the second embodiment

FIG. 12 is a block diagram showing a main part of an automatic traveling control unit 13 according to this embodiment. As shown in FIG. 12, the automatic traveling control unit 13 includes a control target value calculation unit 13a and a command value arithmetic unit 13b.

The control target value calculation unit 13a according to this embodiment is substantially equal to the control target value calculation unit 13a according to the first embodiment. On the other hand, the command value arithmetic unit 13b according to this embodiment is configured such that a rear wheel steering angle arithmetic unit $13b_6$ which calculates a control command value supplied to the steering control device 28 is added to the configuration according to the first embodiment shown in FIG. 8.

To adjust a target longitudinal acceleration $T_{Ax}$, it is necessary to adjust braking forces and driving forces applied to respective wheels. In the command value arithmetic unit 13b according to this embodiment where the in-wheel motor mechanisms 35 are mounted on the vehicle 20, a driving force arithmetic unit $13b_2$ and a braking force arithmetic unit $13b_3$ can be treated as one command value arithmetic unit.

To adjust a target lateral acceleration $T_{Ay}$, it is necessary to adjust a front wheel steering angle and a rear wheel steering angle. In the command value arithmetic unit $13b$ according to this embodiment where the in-wheel motor mechanisms 35 are mounted on the vehicle 20, the lateral acceleration of the vehicle 20 can be finely adjusted by adjusting vertical loads of the respective wheels by an attenuation force arithmetic unit $13b_4$ and a stroke amount arithmetic unit $13b_5$.

In the same manner as the first embodiment, to adjust a target vertical acceleration $T_{Az}$, it is necessary to adjust the attenuation force arithmetic unit $13b_4$ and the stroke amount arithmetic unit $13b_5$.

Further, by adjusting the longitudinal acceleration of the vehicle 20 by a driving force arithmetic unit $13b_2$ and a braking force arithmetic unit $13b_3$, loads applied to front wheels and rear wheels of the vehicle 20 can be distributed so that the vertical acceleration can also be adjusted.

To adjust a target yaw rate $T_{Ry}$ which is one of the control target values, in the same manner as the target lateral acceleration $T_{Ay}$, it is necessary to adjust the front wheel steering angle arithmetic unit $13b_1$ and the rear wheel steering angle arithmetic unit $13b_6$.

To adjust a target roll rate Rr which is one of the control target values, it is necessary to adjust a front wheel steering angle calculated by the front wheel steering angle arithmetic unit $13b_1$ and the rear wheel steering angle arithmetic unit $13b_6$.

It is also possible to adjust the roll movement of the vehicle 20 by adjusting attenuation forces or stroke amounts applied to left and right wheels by the attenuation force arithmetic unit $13b_4$ or the stroke amount arithmetic unit $13b_5$.

To adjust a target pitch rate $T_{Rp}$ which is one of the control target values, it is necessary to adjust sinking on a front side of the vehicle and a rear side of the vehicle by adjusting the attenuation force arithmetic unit $13b_4$ and the stroke amount arithmetic unit $13b_5$ in the same manner as the target vertical acceleration $T_{Az}$.

Further, it is possible to adjust the pitch movement of the vehicle 20 by adjusting the longitudinal acceleration of the vehicle 20 by a driving force arithmetic unit $13b_2$ or a braking force arithmetic unit $13b_3$.

As has been described heretofore, also in the automatic driving system according to this embodiment to which the in-wheel motor mechanisms and the rear wheel steering mechanism are added, by changing the vehicle movement allowable values C of the automatic driving corresponding to a line of sight and behavior of an occupant, it is possible to realize the automatic driving with high comfortability which suits the behavior of the occupant.

Third Embodiment

A vehicle control system 1 according to a third embodiment of the present invention is described with reference to FIG. 13 to FIG. 15. The repeated description of constitutional elements substantially equal to the corresponding constitutional elements in the second embodiment is omitted.

Figure 13:
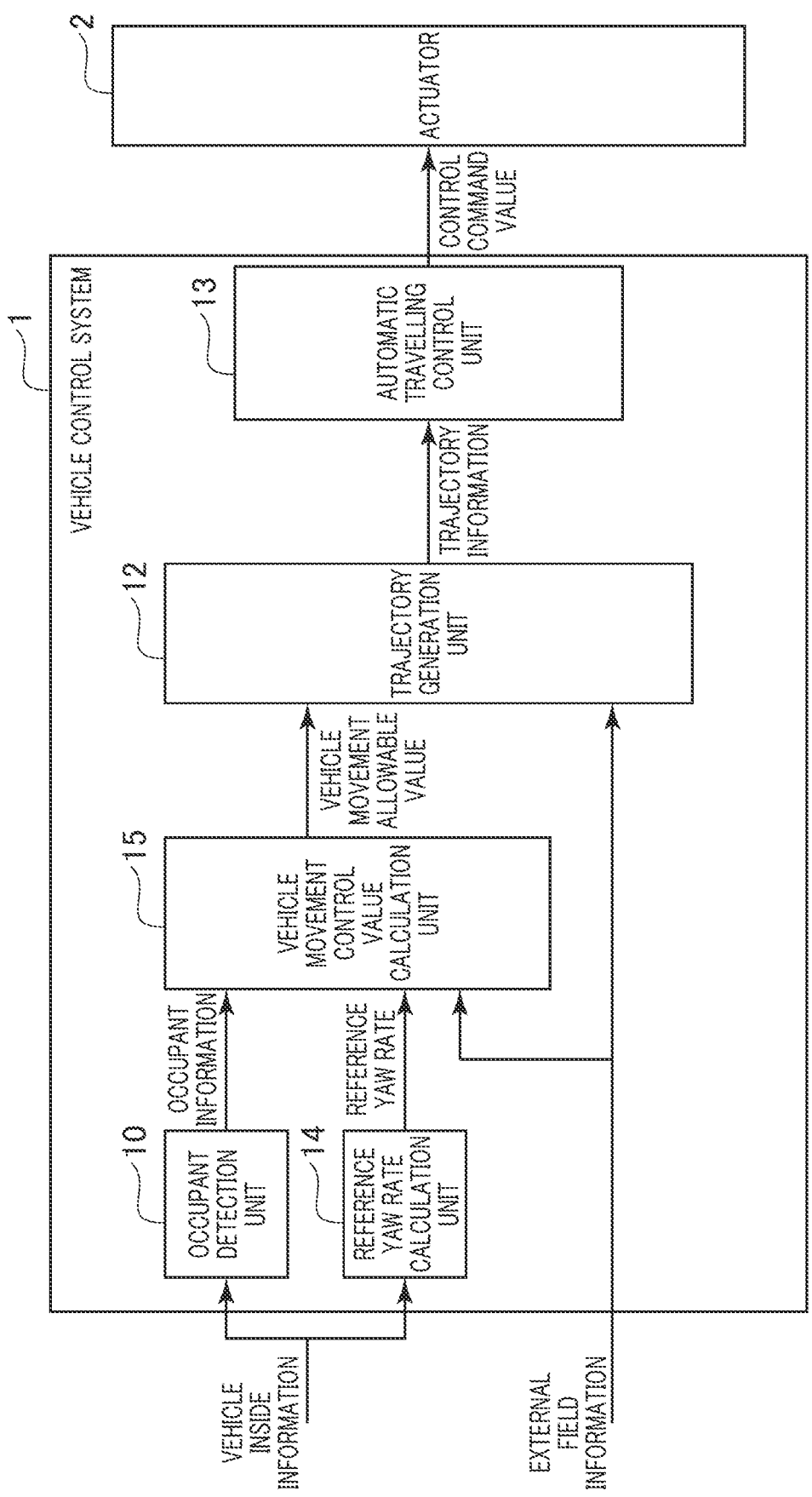
FIG. 13 is a block diagram provided for describing an operation of a vehicle control system according to a third embodiment.

FIG. 13 is a block diagram showing a main part of a vehicle control system 1 according to this embodiment. As shown in FIG. 13, the vehicle control system 1 according to this embodiment is configured such that a reference yaw rate calculation unit 14 and a vehicle movement control value calculation unit 15 are added to the vehicle control system 1 according to the second embodiment.

Figure 14:
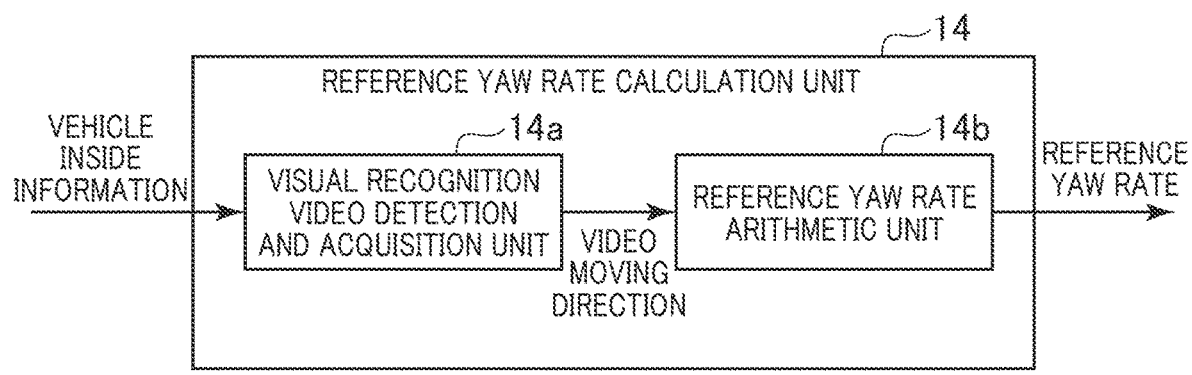
FIG. 14 is a block diagram provided for describing an operation of a reference yaw rate calculation unit according to the third embodiment.

FIG. 14 is a block diagram showing a main part of the reference yaw rate calculation unit 14. As shown in the drawing, the reference yaw rate calculation unit 14 includes a visual recognition video detection and acquisition unit 14a and a reference yaw rate arithmetic unit 14b.

The visual recognition video detection and acquisition unit 14a detects and acquires a moving direction of a video which flows in a vehicle based on vehicle inside information which an inner sensor 21 acquires.

The reference yaw rate arithmetic unit 14b calculates a reference yaw rate based on video information outputted from the visual recognition video detection and acquisition unit. More specifically, the reference yaw rate arithmetic unit 14b calculates what kind of yaw movement an occupant perceives as line-of-sight information based on a moving direction of the image.

As a method of acquiring the moving direction of the video, there are a case where the moving direction of the video is acquired from above an inner sensor 21 at real time, and a case where the moving direction is acquired in advance when a video of a visual recognition object is known in advance. In a case where an occupant wants to select a video such as a movie from a database incorporated in a vehicle 20 or in a case where an occupant downloads a moving image of entertainment content from a cloud, the visual recognition video detection and acquisition unit 14a can acquire the moving direction of the video in advance.

Figure 15:
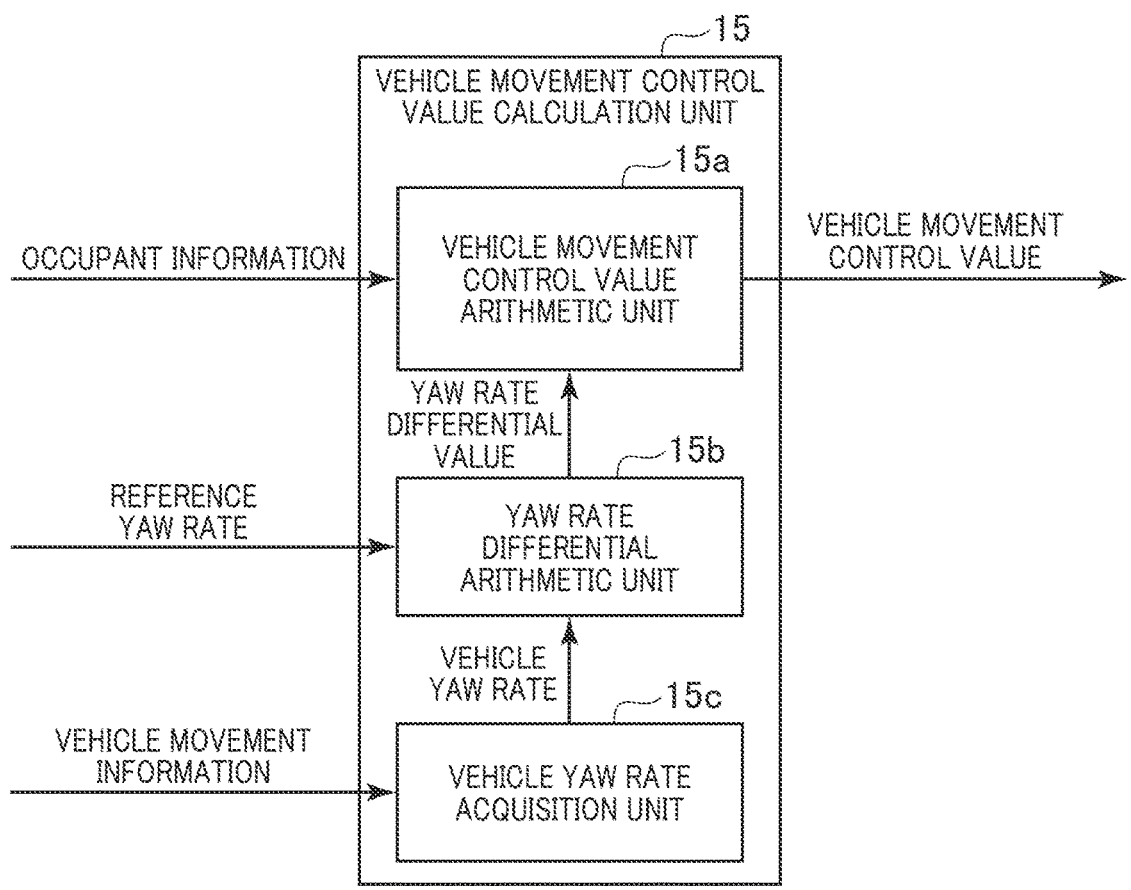
FIG. 15 is a block diagram provided for describing an operation of a vehicle movement control value calculation unit according to the third embodiment.

FIG. 15 is a block diagram showing a main part of a vehicle movement control value calculation unit 15 according to this embodiment. As shown in FIG. 15, the vehicle movement control value calculation unit 15 includes a vehicle movement control value arithmetic unit 15a, a yaw rate differential arithmetic unit 15b, and a vehicle yaw rate acquisition unit 15c.

The vehicle yaw rate acquisition unit 15c acquires vehicle movement information acquired from inner sensors 34, particularly, a gyro sensor, and acquires a vehicle yaw rate. In this case, a value of the vehicle movement information may be processed by using a filter such as a low pass filter.

The yaw rate differential arithmetic unit 15b calculates a differential between a vehicle yaw rate outputted from the vehicle yaw rate acquisition unit 15c and a reference yaw rate outputted from the reference yaw rate calculation unit 14.

The vehicle movement control value arithmetic unit 15a calculates a vehicle movement control value based on a riding position of an occupant outputted from an occupant information detection unit 10 and a yaw rate differential value outputted from the yaw rate differential arithmetic unit. In this case, it is desirable to adjust the vehicle movement such that the yaw rate differential value is reduced.

As has been described above, according to the vehicle control system 1 of this embodiment, unlike the first embodiment and the second embodiment where only the vehicle movement allowable values C are decided, it is possible to prevent carsick of an occupant caused by moving direction of a video that the occupant is viewing and to provide a feeling of being actually present in a vehicle since the video and the movement are provided in an interlocking manner.

Fourth Embodiment

A vehicle control system 1 according to a fourth embodiment of the present invention is described with reference to FIG. 16 to FIG. 18. The repeated description of constitutional elements substantially equal to the corresponding constitutional elements in the above-mentioned embodiments is omitted.

Figure 16:
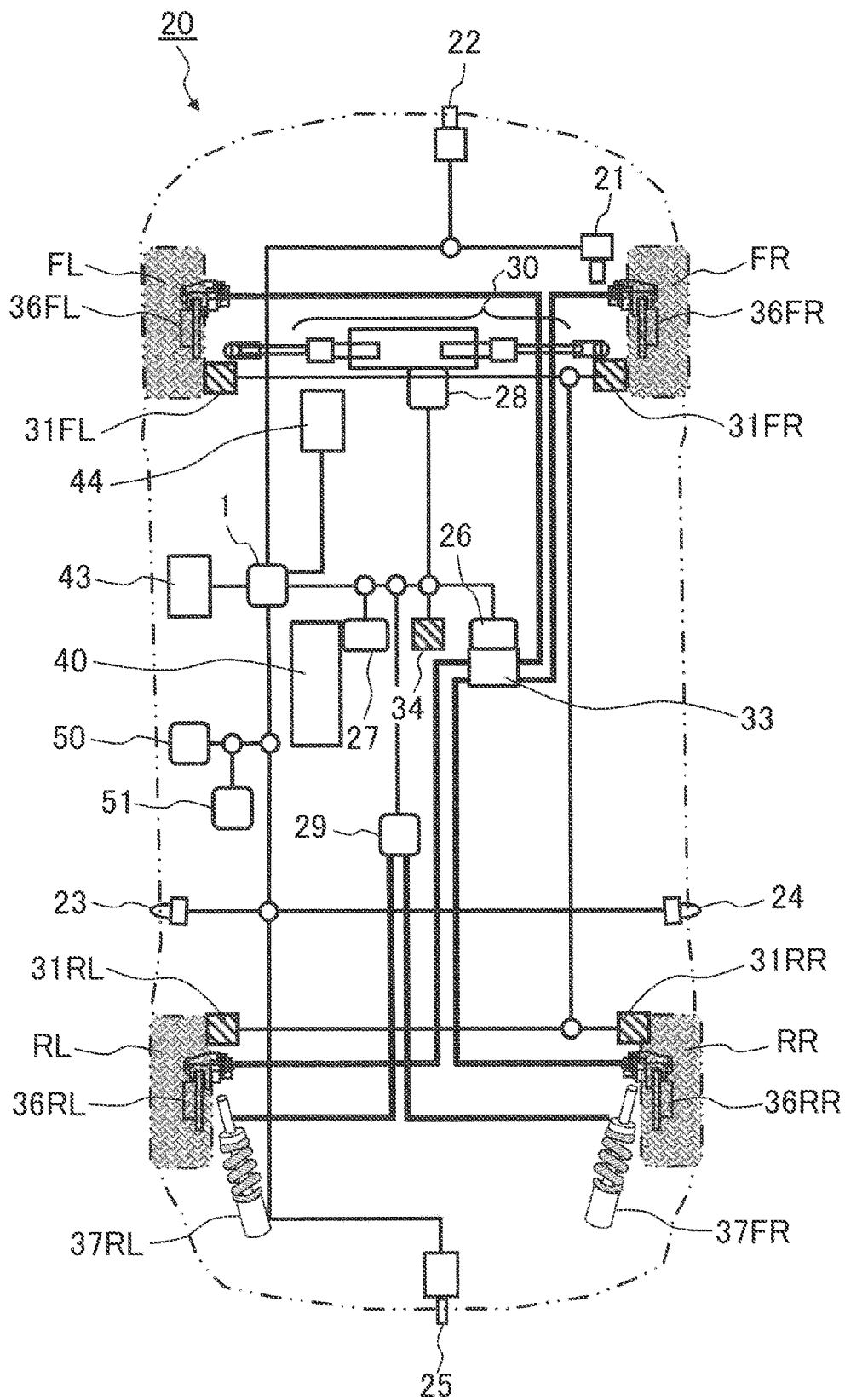
FIG. 16 is a schematic configurational view of a vehicle to which a fourth embodiment is applied.

FIG. 16 is an overall configurational view of a vehicle 20 on which a vehicle control system 1 according to this embodiment is mounted as viewed from above. This embodiment is configured such that a global positioning system (GPS) receiving unit 50 and a map database 51 are added to the configuration of the vehicle 20 according to the first embodiment shown in FIG. 1.

The map database 51 is a database which contains map information. The map database 51 is, for example, formed in an HDD mounted on the vehicle 20. As the form of the map database 51, two cases are considered. In one case, the map database 51 possesses map information without changing the map information. In the other case, map information is successively downloaded from a cloud. The map information includes, for example, position information on roads, information on shapes of roads (for example, the difference between a curved portion and a straight line portion, the number of lanes, curvatures of curved portions and the like), position information on intersections and junctions.

Further, the own position estimation of an own car is performed by using a technique such as matching with GPS information and position information of stationary objects such as buildings or simultaneous localization and mapping (SLAM).

Figure 17:
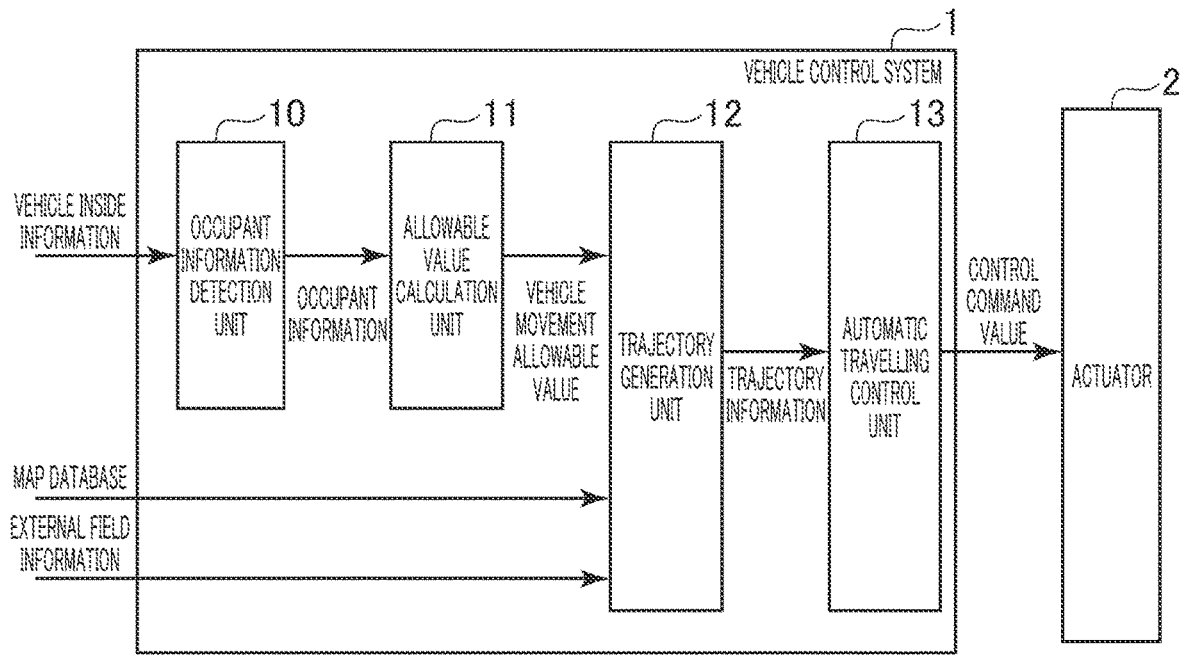
FIG. 17 is a block diagram provided for describing an operation of a vehicle control system according to the fourth embodiment.

FIG. 17 is a block diagram of a main part of the vehicle control system 1 according to this embodiment. Map information from the map database 51 is added to the vehicle control system 1 according to the first embodiment as input information.

Figure 18:
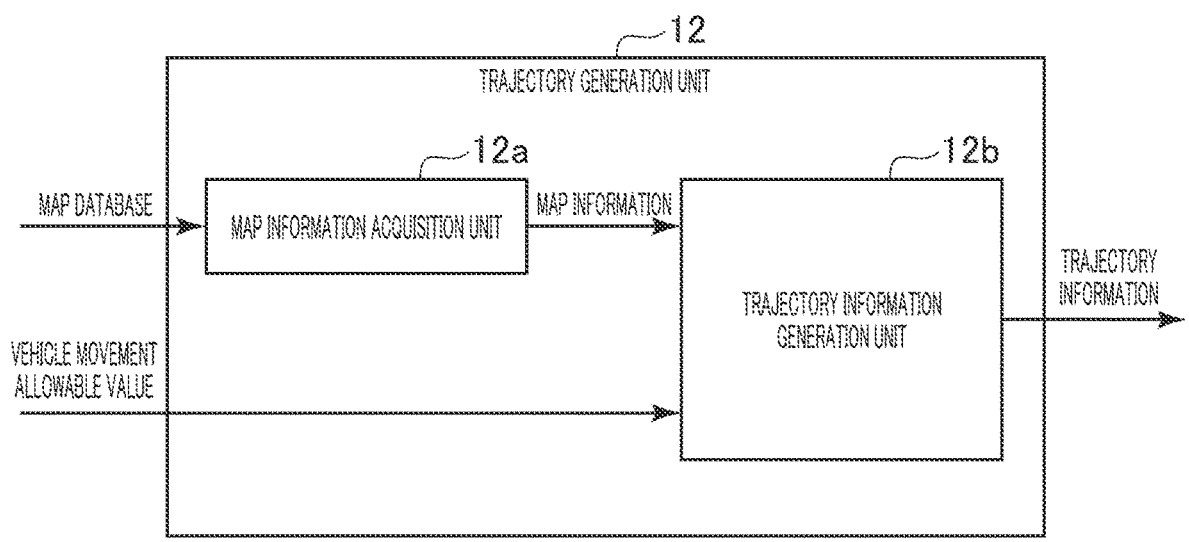
FIG. 18 is a block diagram provided for describing an operation of a trajectory generation unit according to the fourth embodiment.

FIG. 18 is a block diagram showing a main part of a trajectory generation unit 12 according to this embodiment. As shown in the drawing, the trajectory generation unit 12 includes a map information acquisition unit 12a and a trajectory information generation unit 12b.

The map information acquisition unit 12a acquires necessary information from the map database for complementing map information acquired by vehicle mounted sensors 22 to 25 (for example, map information formed of point cloud data). For example, during a traffic jam, the number of vehicles around an own vehicle is large and hence, the number of regions which become occupant's blind spots is increased. Accordingly, it is difficult to prepare a map having a long distance using the vehicle mounted sensors 22 to 25. Under such a circumstance, the map information acquisition unit 12a plays an important role.

The trajectory information generation unit 12b calculates a trajectory based on map information outputted from the map information acquisition unit 12a and the vehicle movement allowable values C. With the use of fine map information in a wide range, the vehicle 20 can travel within the vehicle movement allowable values C.

The system operation after the trajectory is generated is substantially equal to the corresponding system operation of the first embodiment.

Fifth Embodiment

Figure 19:
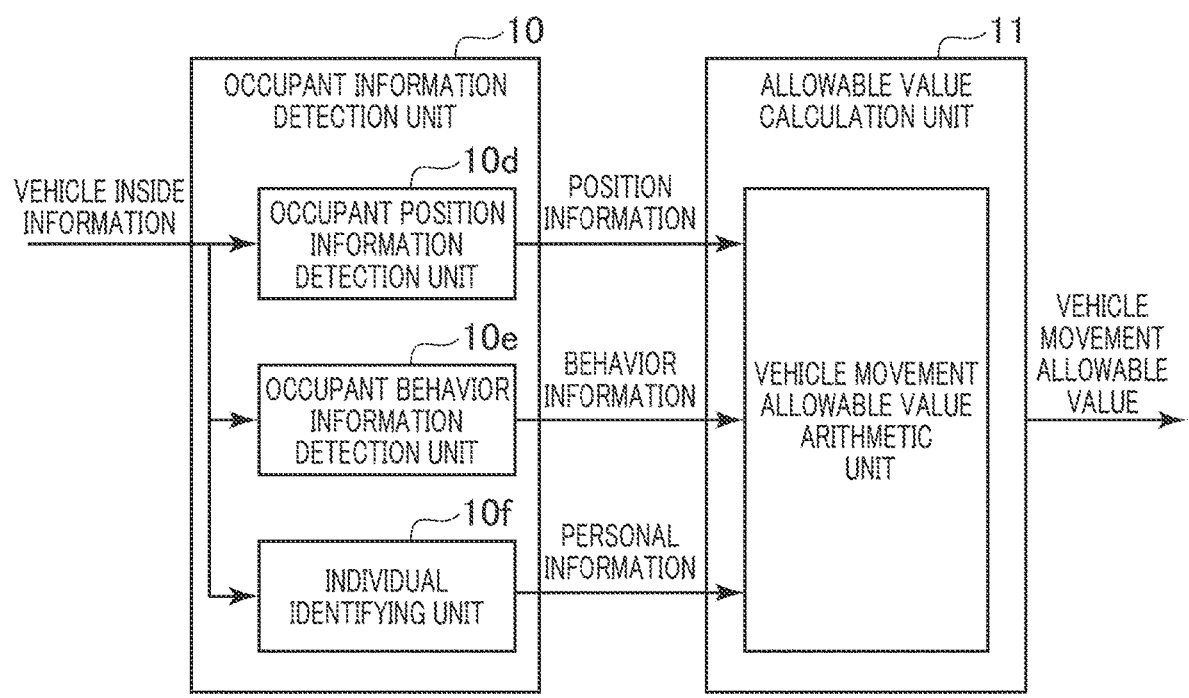
FIG. 19 is a block diagram provided for describing an operation of a part of a vehicle control system according to a fifth embodiment.

A vehicle control system 1 according to a fifth embodiment of the present invention is described with reference to FIG. 19. The repeated description of constitutional elements substantially equal to the corresponding constitutional elements in the above-mentioned embodiments is omitted.

The overall configuration of the vehicle control system 1 according to this embodiment is substantially equal to the corresponding configuration of the vehicle control system 1 according to the first embodiment. However, the vehicle control system 1 according to this embodiment differs from the vehicle control system 1 according to the first embodiment with respect to the configuration of an occupant information detection unit 10 and the configuration of an allowable value calculation unit 11. That is, the occupant information detection unit 10 includes an occupant position information detection unit 10d, an occupant behavior information detection unit 10e, and an individual identifying unit 10f.

The occupant position information detection unit 10d detects the position of an occupant and the direction of the occupant based on inputted vehicle inside information.

The occupant behavior information detection unit 10e detects and estimates the behavior of an occupant and a visual recognition object based on inputted vehicle inside information.

The individual identifying unit 10f identifies who an occupant is based on inputted vehicle inside information, and acquires vehicle movement information which suits preference of the identified individual occupant. As a method of identifying the individual, facial recognition by a camera, an identifying method based on biological information as represented by vein recognition, recognition associated with a smartphone of an occupant, inputting of personal information by a user and the like are named.

After an individual is identified, the movement of the vehicle which the individual prefers is analyzed based on the database, and the movement of the vehicle is outputted as personal information. Further, a technique may be used where the system forms the preference of an occupant by learning and asks the occupant to input his or her preference instead of detecting the preference from data.

The allowable value calculation unit 11 calculates allowable values C based on occupant position information and occupant direction information outputted from the occupant position information detection unit 10d, occupant behavior and visual recognition object outputted from the occupant behavior information detection unit 10e, and personal information outputted from the individual identifying unit 10f. Accordingly, the trajectory which more suits the preference of an individual is generated by the vehicle control system and hence, individual persons can comfortably perform behaviors in a vehicle.

The present invention is not limited to the above-mentioned respective embodiments, and includes various modifications. For example, the above-mentioned embodiments are described in detail for facilitating the understanding of the present invention, and the present invention is not necessarily limited to the configurations which include all constitutional elements. Further, a part of the configurations of one embodiment can be replaced with the configuration of another embodiment. The configuration of one embodiment can be added to the configuration of another embodiment. With respect to respective embodiments, the addition, the deletion or the replacement of other configurations can be made.

LIST OF REFERENCE SIGNS

1: vehicle control system
10: occupant information detection unit
10a: line-of-sight information estimation unit
10b: visual recognition object estimation unit 10c: occupant direction estimation unit
10d: occupant position information detection unit
10e: occupant behavior information detection unit
10f: individual identifying unit
11: allowable value detection unit
12: trajectory generation unit
12a: map information acquisition unit
12b: trajectory information generation unit
13: automatic traveling control unit
13a: control target value calculation unit
13b: command value arithmetic unit
$13b_1$: front wheel steering angle arithmetic unit
$13b_2$: driving force arithmetic unit
$13b_3$: braking force arithmetic unit
$13b_4$: attenuation force arithmetic unit
$13b_5$: stroke amount arithmetic unit
$13b_6$: rear wheel steering angle arithmetic unit
14: reference yaw rate arithmetic unit
14a: visual recognition video detection and acquisition unit
14b: reference yaw rate arithmetic unit
15: vehicle movement control value calculation unit
15a: vehicle movement control value arithmetic unit
15b: yaw rate differential arithmetic unit
15c: vehicle yaw rate acquisition unit
20: vehicle
21: inner sensor
22 to 25: vehicle mounted sensor
26: brake control device
27: drive control device
28: steering control device
29: suspension control device
30: front wheel steering mechanism
32: rear wheel steering mechanism
33: brake mechanism
35: in-wheel motor mechanism
37: suspension mechanism
40: drive mechanism
50: GPS receiving unit
51: map database

The invention claimed is:

1. A vehicle control system which enables a vehicle to perform automatic traveling, the system comprising:
an occupant information detection unit configured to detect position information and behavior information of an occupant based on vehicle inside information;
an allowable value calculation unit configured to calculate a vehicle movement allowable value based on the position information and the behavior information which the occupant information detection unit detects;
a trajectory generation unit configured to generate trajectory information including a scheduled route and a scheduled time of traveling based on the vehicle movement allowable value calculated by the allowable value calculation unit; and
an automatic traveling control unit configured to generate a control command value transmitted to an actuator of the vehicle corresponding to the trajectory information which the trajectory generation unit generates, wherein the occupant information detection unit is configured to acquire or detect line-of-sight information relating to a line-of-sight direction of the occupant, and is configured to estimate whether a visual recognition object of the occupant exists outside the vehicle or inside the vehicle based on the line-of-sight information, and
the allowable value calculation unit is configured to, in the case where the occupant information detection unit estimates that the visual recognition object exists inside the vehicle, make the vehicle movement allowable value small compared to a case where the occupant information detection unit estimates that the visual recognition object exists outside the vehicle,
the occupant information detection unit is configured to, in the case where the visual recognition object is a video existing inside the vehicle, detect or acquire whether the video is a still image or a moving image, and
the allowable value calculation unit is configured to, in the case where the video is the still image, make the vehicle movement allowable value small compared to the case where the video is the moving image.

2. The vehicle control system according to claim 1, wherein the trajectory generation unit is configured to generate the trajectory information based on the vehicle movement allowable value relating to at least one of a longitudinal acceleration, a lateral acceleration, a vertical acceleration, a yaw rate, a roll rate, and a pitch rate of the vehicle.

3. The vehicle control system according to claim 1, wherein the actuator is a front wheel steering mechanism, a rear wheel steering mechanism, a drive mechanism, a braking mechanism or a suspension mechanism, and
wherein the automatic traveling control unit is configured to generate at least one of a front wheel steering angle of the front wheel steering mechanism, a rear wheel steering angle of the rear wheel steering mechanism, a driving force of the drive mechanism, a braking force of the braking mechanism, and an attenuation force or a stroke amount of the suspension mechanism.

4. The vehicle control system according to claim 1, wherein the occupant information detection unit is configured to calculate a reference yaw rate based on a moving direction of the moving image, and
wherein the allowable value calculation unit is configured to make a vehicle movement allowable value of the yaw rate small such that a difference between the reference yaw rate and the yaw rate of the vehicle becomes small.

5. The vehicle control system according to claim 1, wherein the occupant information detection unit is configured to estimate whether the occupant grasps the visual recognition object in a case where the visual recognition object exists inside the vehicle, and
wherein the allowable value calculation unit is configured to, in a case where the occupant grasps the visual recognition object, make the vehicle movement allowable value small compared to a case where the occupant does not grasp the visual recognition object.

6. The vehicle control system according to claim 1, wherein the occupant information detection unit is configured to acquire or estimate occupant direction information relating to a direction of a body of the occupant, and
wherein the allowable value calculation unit is configured to, in a case where the occupant direction information differs from advancing direction information of the vehicle, make the vehicle movement allowable value small compared to a case where the occupant direction information and the advancing direction information of the vehicle substantially agree with each other.

7. The vehicle control system according to claim 2, wherein the trajectory generation unit is configured to, in a case where an allowable value of the lateral acceleration is small, generate only the yaw rate without generating the lateral acceleration, thus generating the trajectory information which makes the vehicle rotate on its site.

8. The vehicle control system according to claim 1, wherein the trajectory generation unit is configured to acquire map information, and is configured to generate the trajectory information by making use of the map information in addition to the vehicle movement allowable value.

9. The vehicle control system according to claim 1,
   wherein the occupant information detection unit is configured to identify an occupant, and
   wherein the allowable value calculation unit is configured to change the vehicle movement allowable value corresponding to the identified occupant.

* * * * *